US011704669B1

(12) United States Patent
Ratnakaram et al.

(10) Patent No.: US 11,704,669 B1
(45) Date of Patent: Jul. 18, 2023

(54) DYNAMIC CONTACTLESS PAYMENT PROCESSING BASED ON REAL-TIME CONTEXTUAL INFORMATION

(71) Applicant: Bank of America Corporation, Charlotte, NC (US)

(72) Inventors: Udaya Kumar Raju Ratnakaram, Telangana (IN); Puneetha Polasa, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/567,232

(22) Filed: Jan. 3, 2022

(51) Int. Cl.
*G06Q 40/00* (2023.01)
*G06Q 20/40* (2012.01)

(52) U.S. Cl.
CPC ................................ *G06Q 20/4015* (2020.05)

(58) Field of Classification Search
CPC .................................................. G06Q 20/4015
See application file for complete search history.

(56) References Cited

U.S. PATENT DOCUMENTS

| | | | |
|---|---|---|---|
| 6,041,315 | A | 3/2000 | Pollin |
| 7,689,446 | B2 | 3/2010 | Sagar |
| 8,364,556 | B2 | 1/2013 | Nguyen et al. |
| 8,498,935 | B2 | 7/2013 | Leavitt et al. |
| 2010/0262440 | A1 | 10/2010 | Ulring |
| 2015/0088709 | A1* | 3/2015 | Mekala .................. G06Q 30/04 |
| | | | 705/34 |
| 2015/0356562 | A1* | 12/2015 | Siddens .............. G06Q 20/4016 |
| | | | 705/44 |
| 2017/0364890 | A1 | 12/2017 | Malhotra et al. |
| 2020/0104843 | A1* | 4/2020 | Bhasin ............... G06Q 20/4015 |
| 2021/0174366 | A1* | 6/2021 | Zeng .................. G06Q 20/4016 |
| 2021/0365947 | A1* | 11/2021 | Benkreira .......... G06Q 20/4015 |

FOREIGN PATENT DOCUMENTS

CA  3053957 A1 * 8/2018 ......... G06F 21/6245

OTHER PUBLICATIONS

Office of the Comptroller of the Currency (OCC) (Comptrollers Handbook, Payment Systems Version 1.0, Oct. 2021 https://www.occ.gov/publications-and-resources/publications/comptrollers-handbook/files/payment-sys-funds-transfer-activities/pub-ch-payment-systems.pdf, Oct. 2021) (Year: 2021).*

* cited by examiner

*Primary Examiner* — Elizabeth H Rosen
*Assistant Examiner* — Mark H Gaw
(74) *Attorney, Agent, or Firm* — Banner & Witcoff, Ltd.

(57) ABSTRACT

Arrangements for payment and recommendation control are provided. In some aspects, contextual data may be received from a user. For instance, data such as calendar data may be received and an event may be identified. Based on the event, a pre-authorized amount may be identified for payment associated with the event. The system may receive a request for payment and event details. The amount may be compared to the pre-authorized amount and, if more than the pre-authorized amount, a request for payment authorization may be transmitted to a user device. If the amount is not more than the pre-authorized amount, expected location data of the user may be received and current location data of the user may be requested from a user device. The location data may be compared and, if the locations match, the payment may be authorized and automatically processed.

21 Claims, 17 Drawing Sheets

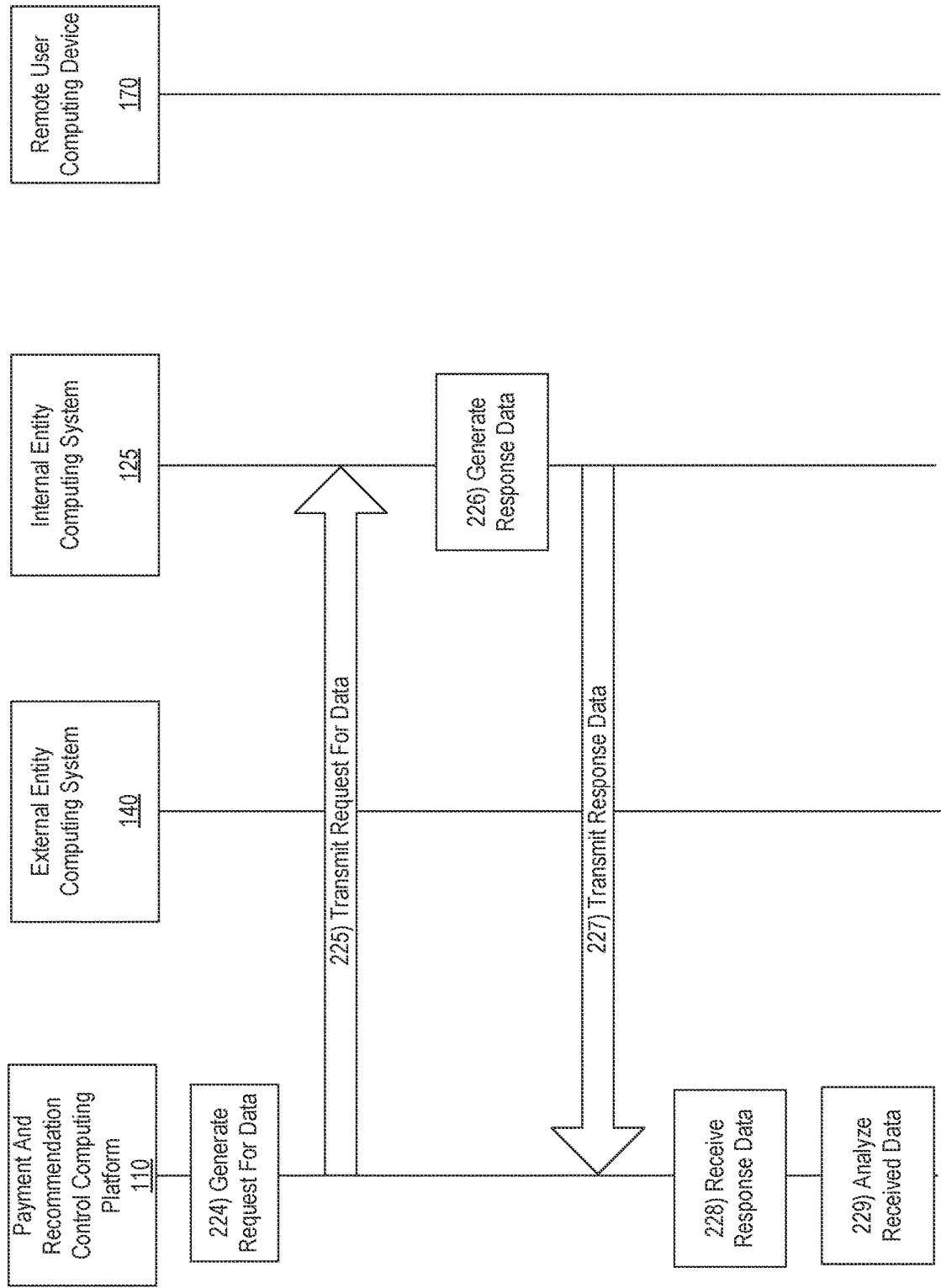

DYNAMIC CONTACTLESS PAYMENT PROCESSING BASED ON REAL-TIME CONTEXTUAL INFORMATION

BACKGROUND

Aspects of the disclosure relate to electrical computers, systems, and devices for seamless, automatic payment or transaction processing based on real-time contextual data.

Electronic payment processing is used by many users. However, conventional electronic payment systems require interaction or input from the user requesting payment. For instance, the user may be required to provide input requesting payment, authorize payment or the like. This can be time consuming for the user. In addition, payment processing requiring user input can be prone to unauthorized activity by unauthorized actors obtaining password data, personal identification number data, and the like. Accordingly, seamless payment or transaction processing that, in at least some examples, is performed without user interaction, may be advantageous.

In addition, in some examples, a user must identify an entity with which the user is engaging (e.g., for payment, scheduling of an event, or the like). This can be time consuming for the user. Given that many users have or interact with one or more electronic user devices, such as a smart phone, fitness tracker, smart watch, or the like, throughout the day, contextual data may be used to streamline processing requests for a user and/or eliminate or reduce a need for user interaction. Accordingly, aspects described herein are directed to using machine learning to evaluate contextual data and generate one or more options that may be processed by the system and, in some examples, without user interaction.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with seamlessly processing transactions and automatically generating recommended options for a user.

In some aspects, contextual data may be received from a user. For instance, data such as calendar data may be received an event may be identified. Based on the event, a pre-authorized amount may be identified for payment associated with the event.

The system may receive a request for payment and event details, including an amount of the event, location of the event, and the like. The amount may be compared to the pre-authorized amount and, if more than the pre-authorized amount, a request for payment authorization may be transmitted to a user device. If the amount is not more than the pre-authorized amount, expected location data of the user may be received and current location data of the user may be requested from a user device. The current location data may be compared to the expected location data and event details and, if the locations match, the payment may be authorized and automatically processed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2K depict an illustrative event sequence for implementing payment and recommendation control functions in accordance with one or more aspects described herein;

DETAILED DESCRIPTION

Figure 1A:
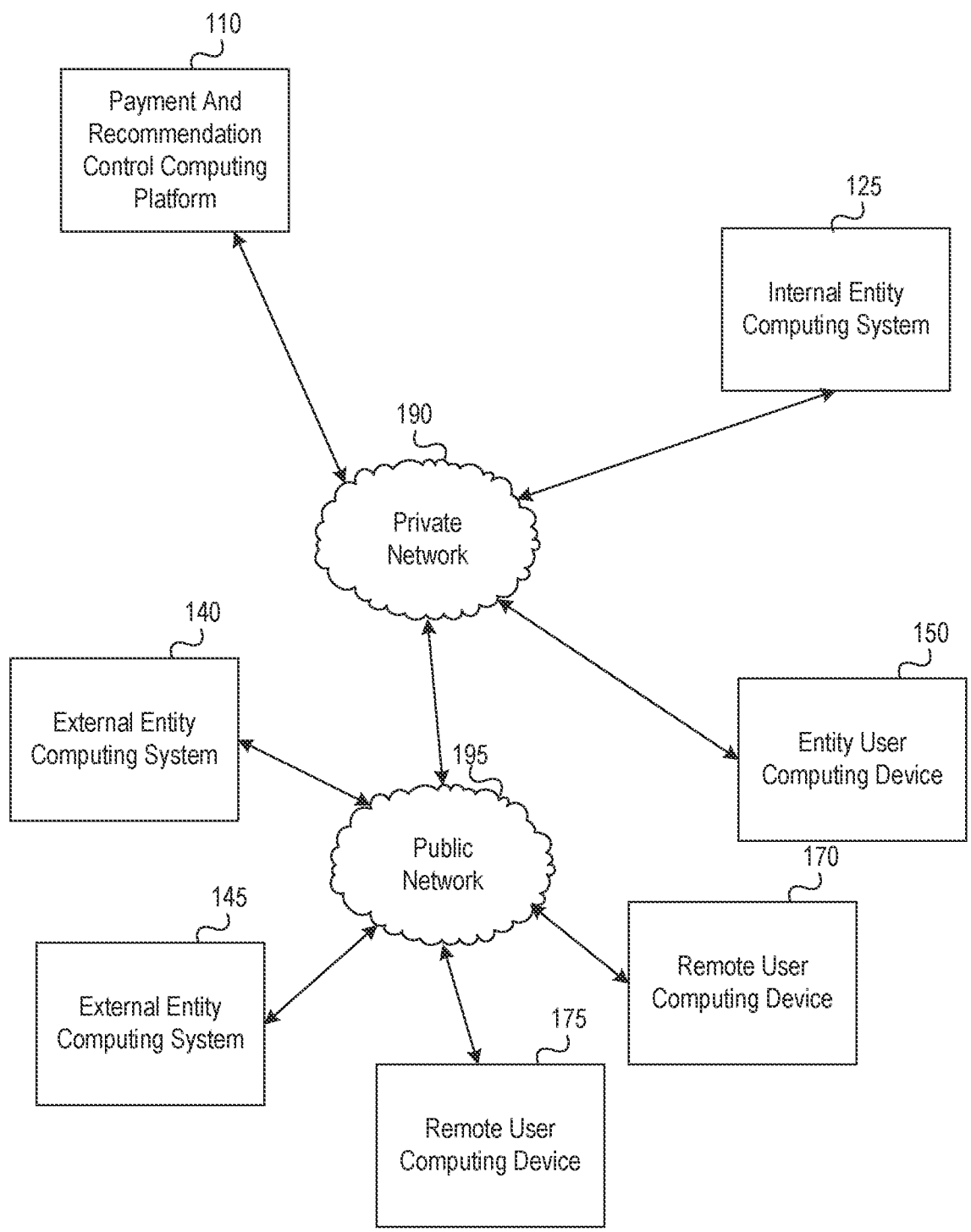
FIGS. 1A and 1B depict an illustrative computing environment for implementing payment and recommendation control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, payment processing and event scheduling can be time consuming and inefficient processes for a user. For instance, in conventional payment arrangements, a user must wait in line, wait for a representative to operate a point-of-sale system, identify a form of payment (cash, card, or the like), provide authentication data, and the like. These processes can be time consuming.

In addition, when scheduling events, such as a reservation at a restaurant, work with a vendor or service provider, or the like, it may be time consuming to identify an entity, such as a restaurant or vendor, call or email the entity to scheduling the event, or the like.

Accordingly, arrangements described herein enable seamless event scheduling and payment processing based on contextual data of a user. For instance, contextual data, such as lifestyle data of a user provided by the user, calendar data of a user, captured from one or more social media sites, captured from user reviews of entities, captured via one or more internet of things (IoT) devices, and the like, may be received with the permission of the user. The contextual data may be received from a plurality of devices or sources, including user devices such as IoT devices including smart phones, table computers, laptop computers, smart watches, fitness trackers, other wearable devices, and the like, as well as other sources including enterprise organization sources storing user purchase history, and the like. Upon receiving a triggering event (e.g., a calendar entry to meet someone for dinner), the system may analyze, using machine learning, the contextual data and event details and may generate one or more recommended options for the user. In some examples, one option may be identified and the event automatically scheduled (e.g., without user input). In other examples, a plurality of recommended options may be generated and presented to the user for selection. Upon receiving user input selecting one of the recommended options, the system may initiate communications with an entity computing system and may send an event scheduling request (e.g., send a reservation request to the selected restaurant). A confirmation of the scheduled event may be received and a notification transmitted to the user that the event is scheduled.

In addition to seamlessly scheduling events based on contextual data, contextual data may also be used for contactless and/or frictionless payment at the event. For instance, once the event is complete, payment for the event can occur in a background and without user interaction.

For example, after the event is complete (e.g., after dinner is complete) a bill or check for payment may be generated. The bill or check may be transferred to the user computing device, such as a smart phone, and then transmitted to the computing platform (e.g., via a mobile banking or other application executing on the device) for analysis. Receipt of the bill or check may trigger or initiate payment evaluation processes.

For instance, the computing platform may authenticate the user and authorize payment based on contextual data. For example, event data including expected location, date and time may be received from a digital calendar of the user. This data may be compared to location and time data from the check or bill, as well as current location data captured via the user computing device. In some examples, an expected or pre-authorized amount may be determined based on the contextual data and, if the amount of the bill or check exceeds that amount, additional authentication and/or verification processes may be executed (e.g., request user input, retrieve or analyze additional contextual data to verify, or the like). Accordingly, if the amount of the check or bill fits within an expected pattern, the bill or check may be automatically paid without user interaction and the user may be notified when payment is complete (e.g., in some examples, only when payment is complete).

These and various other arrangements will be discussed more fully below.

Figure 1B:
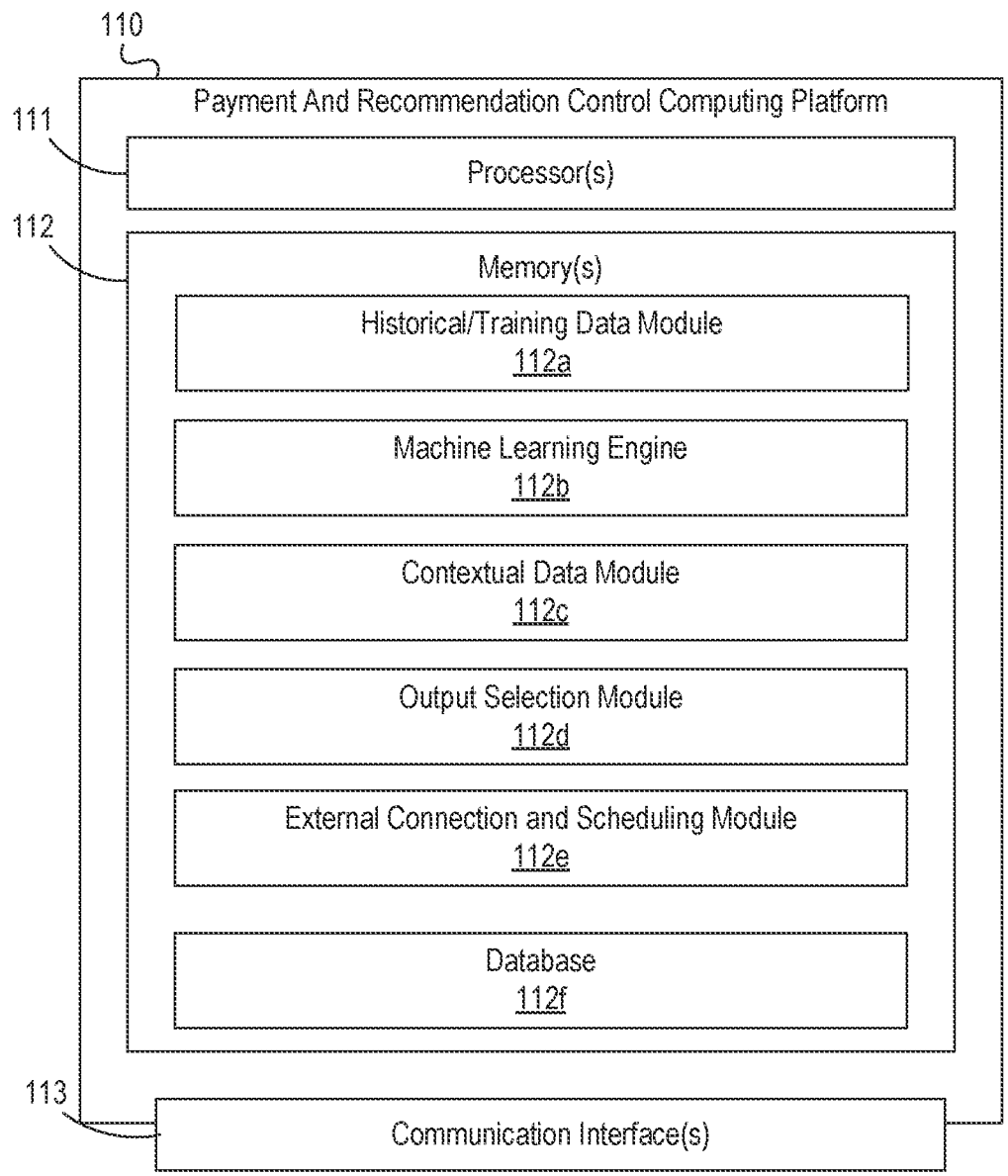

FIGS. 1A-1B depict an illustrative computing environment for implementing and using seamless payment processing and option recommendation control functions in accordance with one or more aspects described herein. Referring to FIG. 1A, computing environment 100 may include one or more computing devices and/or other computing systems. For example, computing environment 100 may include payment and recommendation control computing platform 110, internal entity computing system 125, entity user computing device 150, external entity computing system 140, external entity computing system 145, remote user computing device 170 and remote user computing device 175. Although one internal entity computing system 125, one entity user computing device 150, two external entity computing systems 140, 145, and two remote user computing devices 170, 175, are shown, any number of systems or devices may be used without departing from the invention.

Payment and recommendation control computing platform 110 may be configured to provide intelligent, dynamic, seamless payment processing and option recommendations based on contextual data for a user. For instance, payment and recommendation control computing platform 110 may receive data, such as contextual data, from one or more user devices, such as a smart phone, smart watch, fitness tracker, tablet computing device, or the like, and analyze the data using one or more machine learning models trained on historical data related to contextual data and user preferences. In some examples, the contextual data may include calendar data of the user, data captured from social media platforms, data from user reviews of entities, spending history and habits of the user, food preferences, feed data from IoT devices, and the like. The data may be analyzed to determine one or more recommendations to provide to the user. In some examples, the one or more recommendations may be automatically implemented (e.g., without additional user interaction or input). For example, analyzing the contextual data may identify a restaurant for a user to dine at and the system may automatically connect to the restaurant computing system and reserve a table for the user (e.g., without user interaction). One or more notifications may then be transmitted to the user.

Payment and recommendation computing platform may host, train, execute, update and/or validate the one or more machine learning models. For instance, training or historical data may be received and used to train the machine learning model. The training or historical data may identify sequences or patterns associated with scheduled events, amounts paid, types of events, recommendations, and the like, and train the machine learning model to predict recommendations, identify pre-authorization amounts, identify or select a payment mode, and the like.

In some examples, payment and recommendation control computing platform 110 may store or be in communication with systems that store user payment data. Accordingly, payment and recommendation control computing platform 110 may receive contextual data associated with an event a user is attending (e.g., dinner at a restaurant identified from, for instance, calendar data) and may identify (e.g., using machine learning) a pre-authorized amount that corresponds to an anticipated amount the user will spend for the event. The payment and recommendation control computing platform 110 may receive data associated with the event (e.g., a bill) and contextual data including, for instance, real-time location data associated with a user device, such as a smart phone, and confirm that the user is at the expected location. If so, and the amount of the bill is less than or equal to the pre-authorized amount, the bill may be automatically paid by the payment and recommendation control computing platform 110. If not, the payment and recommendation control computing platform 110 may generate and transmit a notification requesting user input to approve payment.

Internal entity computing system 125 may be or include one or more computing devices or systems associated with or internal to an enterprise organization implementing the payment and recommendation control computing platform 110. For instance, internal entity computing system 125 may store user data, user registration data, account data, and the like. In some examples, internal entity computing system 125 may update one or more account ledgers based on payments or other transactions processed, as described herein.

Entity user computing device 150 may be or include one or more computing devices operated by, for instance, an employee of the enterprise organization to adjust parameters of the payment and recommendation control computing platform 110, and the like.

External entity computing system 140 and/or external entity computing system 145 may be or include one or more computing devices and/or systems that may be associated with one or more entities external to or not associated with the enterprise organization. For instance, external entity computing system 140 and/or external entity computing system 145 may be associated with one or more vendors, restaurants, service providers, or the like. External entity computing system 140 and/or external entity computing system 145 may be configured to communicate with payment and recommendation control computing platform 110 to facilitate scheduling of events, payment for goods or services, and the like. In some examples, external entity computing system 140 and/or external entity computing system 145 may be or include a point-of-sale system at a vendor, restaurant, service provider, or the like.

Remote user computing device 170 and/or remote user computing device 175 may be or include one or more user computing devices, such as a smart phone, smart watch, fitness tracker, tablet computing device, and the like. In some examples, remote user computing device 170 and/or remote user computing device 175 may include any internet of things (IoT) device. In some arrangements, the remote user computing device 170 and/or remote user computing device 175 may capture contextual data that is transmitted to the payment and recommendation control computing platform 110 for processing. For instance, calendar data, purchase data, wellness data (such as activity, fitness level, food intake, or the like) may be captured and transmitted for analysis by the payment and recommendation control computing platform 110.

Computing environment 100 also may include one or more computing platforms. For example, and as noted above, computing environment 100 may include payment and recommendation control computing platform 110. As illustrated in greater detail below, payment and recommendation control computing platform 110 may include one or more computing devices configured to perform one or more of the functions described herein. For example, payment and recommendation control computing platform 110 may include one or more computers (e.g., laptop computers, desktop computers, servers, server blades, or the like).

As mentioned above, computing environment 100 also may include one or more networks, which may interconnect one or more of payment and recommendation control computing platform 110, internal entity computing system 125, entity user computing device 150, external entity computing system 140, external entity computing system 145, remote user computing device 170 and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, payment and recommendation control computing platform 110, internal entity computing system 125, entity user computing device 150, may be associated with an enterprise organization (e.g., a financial institution), and private network 190 may be associated with and/or operated by the organization, and may include one or more networks (e.g., LANs, WANs, virtual private networks (VPNs), or the like) that interconnect payment and recommendation control computing platform 110, internal entity computing system 125, entity user computing device 150, and one or more other computing devices and/or computer systems that are used by, operated by, and/or otherwise associated with the organization. Public network 195 may connect private network 190 and/or one or more computing devices connected thereto (e.g., payment and recommendation control computing platform 110, internal entity computing system 125, entity user computing device 150) with one or more networks and/or computing devices that are not associated with the organization. For example, external entity computing system 140, external entity computing system 145, remote user computing device 170, and/or remote user computing device 175, might not be associated with an organization that operates private network 190 (e.g., because external entity computing system 140, external entity computing system 145, remote user computing device 170, and/or remote user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 140, external entity computing system 145, remote user computing device 170, and/or remote user computing device 175 to private network 190 and/or one or more computing devices connected thereto (e.g., payment and recommendation control computing platform 110, internal entity computing system 120, entity user computing device 150).

Referring to FIG. 1B, payment and recommendation control computing platform 110 may include one or more processors 111, memory 112, and communication interface 113. A data bus may interconnect processor(s) 111, memory 112, and communication interface 113. Communication interface 113 may be a network interface configured to support communication payment and recommendation control computing platform 110 and one or more networks (e.g., private network 190, public network, or the like). Memory 112 may include one or more program modules having instructions that when executed by processor(s) 111 cause payment and recommendation control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of payment and recommendation control computing platform 110 and/or by different computing devices that may form and/or otherwise make up payment and recommendation control computing platform 110.

For example, memory 112 may have, store and/or include historical/training data module 112*a*. Historical/training data module 112*a* may store instructions and/or data that may cause or enable the payment and recommendation control computing platform 110 to receive historical and or training data, including contextual data, related to one or more users, user purchases, user schedules, user orders, and the like and use that data to train one or more machine learning models stored in machine learning engine 112*b*. The historical and/or training data may include, for instance, a previous restaurant experience of a user, what was ordered, a cost and a tip provided. Information of this nature may be received from a plurality of sources, such as internal entity computing system 125 which may, e.g., process one or more account payments for a user, user devices such as remote user computing device 170, remote user computing device 175, and the like. The data may be gathered from a plurality of users and used to build and train one or more machine learning models stored and/or executed by machine learning engine 112b to identify one or more recommendations for a user, determine a pre-authorized amount and whether to automatically process a payment, and the like.

After building and/or training the one or more machine learning models, machine learning engine 112b may receive data, such as contextual data, from various sources and execute the one or more machine learning models to generate an output, such as a recommendation for a user, a pre-authorized amount for a transaction, whether to automatically process a transaction, and the like. For instance, contextual data such as current calendar data of a user (e.g., received from a calendar application executing on remote user computing device 170 and/or remote user computing device 175), reservation data (e.g., received from, e.g., an email application executing on remote user computing device and/or remote user computing device 175 or made via the computing platform 110), previous reservation data, user preferences, historical purchase data, restaurant location data, current user location data (e.g., received from a global positioning system (GPS) executing on remote user computing device 170 and/or remote user computing device 175), or the like, may be used as inputs into the one or more machine learning models and the one or more machine learning models may be executed to generate one or more outputs.

Payment and recommendation control computing platform 110 may further have, store and/or include contextual data module 112c. Contextual data module 112c may store instructions and/or data that may cause or enable the payment and recommendation control computing platform 110 to receive contextual data from a plurality of sources (e.g., internal entity computing system 125, external entity computing system 140, external entity computing system 145, remote user computing device 170, remote user computing device 175, or the like) and store and/or analyze the data (e.g., using machine learning models) to generate one or more outputs for a user. In some examples, contextual data module 112c may store instructions and/or data that may categorize or label data received from the plurality of sources for further analysis. For instance, user calendar data, restaurant check or bill data, location data, and the like, may be identified, categorized and labeled for further analysis.

Payment and recommendation control computing platform 110 may further have, store and/or include output selection module 112d. Output selection module 112d may store instructions and/or data that may cause or enable payment and recommendation control computing platform 110 to select, based on one or more outputs generated by the one or more machine learning models and analysis of contextual data, an output for processing. For instance, the one or more machine learning models may generate more than one output with a recommended vendor, restaurant, service provider, or the like. In some examples, output selection module 112d may select one output from the more than one output generated and may generate instructions to process that output (e.g., automatically process a payment, automatically book a reservation for a user, or the like).

Payment and recommendation control computing platform 110 may further have, store and/or include external connection and scheduling module 112e. External connection and scheduling module 112e may store instructions and/or data that may cause or enable the payment and recommendation control computing platform 110 to establish a connection and/or communication session with an external system, such as external entity computing system 140, external entity computing system 145, or the like, and perform or execute one or more processes or functions with the external system. For instance, external connection and scheduling module 112e may schedule a reservation or appointment for a user, may automatically process a bill or check for the user, and the like.

Payment and recommendation control computing platform 110 may further have, store and/or include a database 112f. Database 112f may store historical data associated with one or more users, user response data (e.g., user input received in response to a request for user input, and the like), and the like.

FIGS. 2A-2K depict one example illustrative event sequence for executing payment and recommendation control functions in accordance with one or more aspects described herein. The events shown in the illustrative event sequence are merely one example sequence and additional events may be added, or events may be omitted, without departing from the invention. Further, one or more processes discussed with respect to FIGS. 2A-2K may be performed in real-time or near real-time.

Figure 2A:
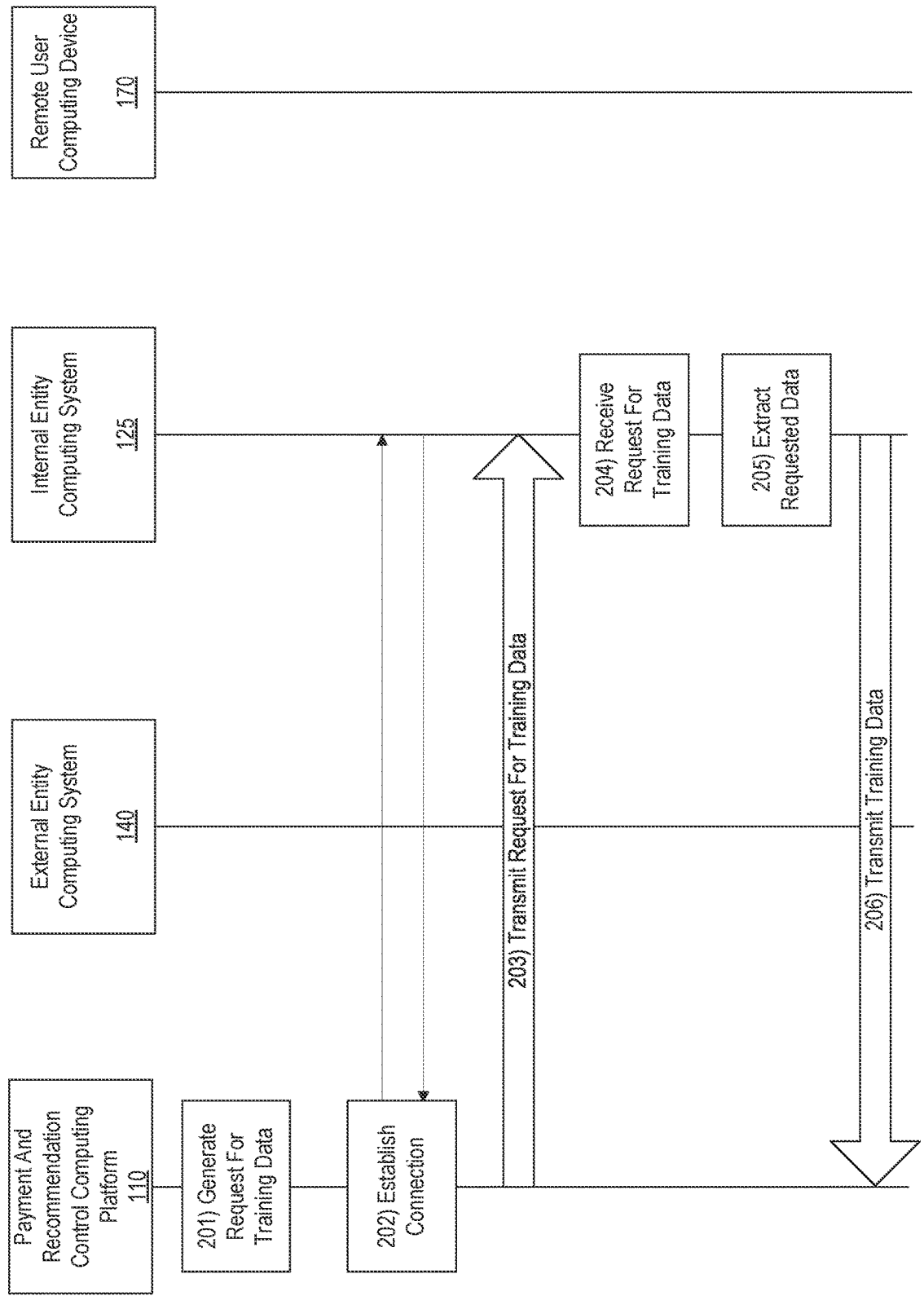

Referring to FIG. 2A, at step 201, the payment and recommendation control computing platform 110 may generate a request for training and/or historical data. For instance, a request for historical data related to user purchases, user preferences, prior reservations at restaurants, amounts spent, and the like, may be requested. In some examples, the data may be requested from a plurality of computing devices.

For instance, at step 202, a connection may be established between the payment and recommendation control computing platform 110 and internal entity computing system 125. For instance, a first wireless connection may be established between the payment and recommendation control computing platform 110 and internal entity computing system 125. Upon establishing the first wireless connection, a communication session may be initiated between payment and recommendation control computing platform 110 and internal entity computing system 125.

At step 203, the request for historical and/or training data may be transmitted by the payment and recommendation control computing platform 110 to the internal entity computing system 125. For instance, the generated request for data may be transmitted during the communication session initiated upon establishing the first wireless connection.

At step 204, the request for training data and/or historical data may be received by internal entity computing system 125. In some examples, internal entity computing system 125 may store data associated with previous user purchases, browsing history data, calendar data, and the like. The data may be received and stored by the internal entity computing system 125 with appropriate permissions of the user and/or may be anonymized.

At step 205, internal entity computing system 125 may extract the requested data. For instance, data may be extracted from one or more databases, applications, or the like, including the requested data.

At step 206, the extracted training data and/or historical data may be transmitted by the internal entity computing system 125 to the payment and recommendation control computing platform 110. In some examples, the extracted data may be transmitted during the communication session initiated upon establishing the first wireless connection. In other examples, a new connection and/or communication session may be initiated and/or established.

Figure 2B:
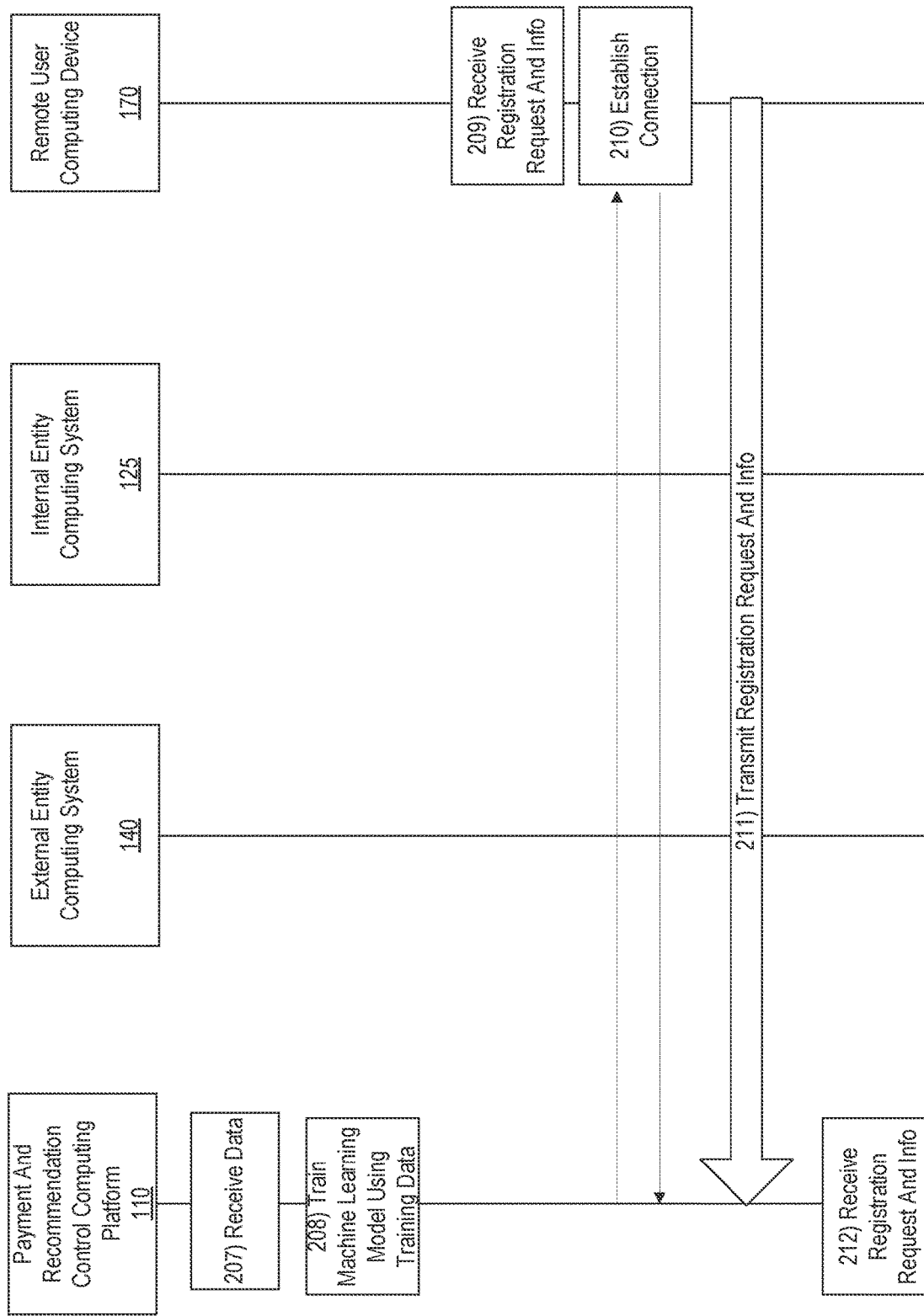

With reference to FIG. 2B, at step 207, the payment and recommendation control computing platform 110 may receive the extracted data.

At step 208, the extracted data may be used by the payment and recommendation control computing platform 110 to build and/or train one or more machine learning models. For instance, the data may be tagged and sequences or patterns identified indicating user preferences, expected or predicts amounts to spend at a particular location, choice of payment device, and the like. The one or more machine learning models may be trained based on this and, in some examples, additional data from one or more sources, and may be executed to generate one or more outputs including recommendations for vendors, restaurants, service providers, and the like, a recommended payment device, an expected amount to pre-approve for an event, and the like.

At step 209, remote user computing device 170 may receive a registration request and registration information. In some examples, requesting training data and/or training the one or more machine learning models may be performed before this step (and related steps) or after this step (and related steps). In some examples, the registration information may include user identifying information, account and/or payment device information, user preferences (e.g., number of options to display, or the like), user device identifying data (e.g., international mobile equipment identity (IMEI) data, phone number, or the like), and the like.

At step 210, a connection may be established between the payment and recommendation control computing platform 110 and remote user computing device 170. For instance, a second wireless connection may be established between the payment and recommendation control computing platform 110 and remote user computing device 170. Upon establishing the second wireless connection, a communication session may be initiated between payment and recommendation control computing platform 110 and remote user computing device 170.

At step 211, the request for registration and associated information may be transmitted by the remote user computing device 170 to the payment and recommendation control computing platform 110. For instance, the request for registration and associated information may be transmitted during the communication session initiated upon establishing the second wireless connection.

At step 212, the registration request and associated information may be received by the payment and recommendation control computing platform 110.

Figure 2C:
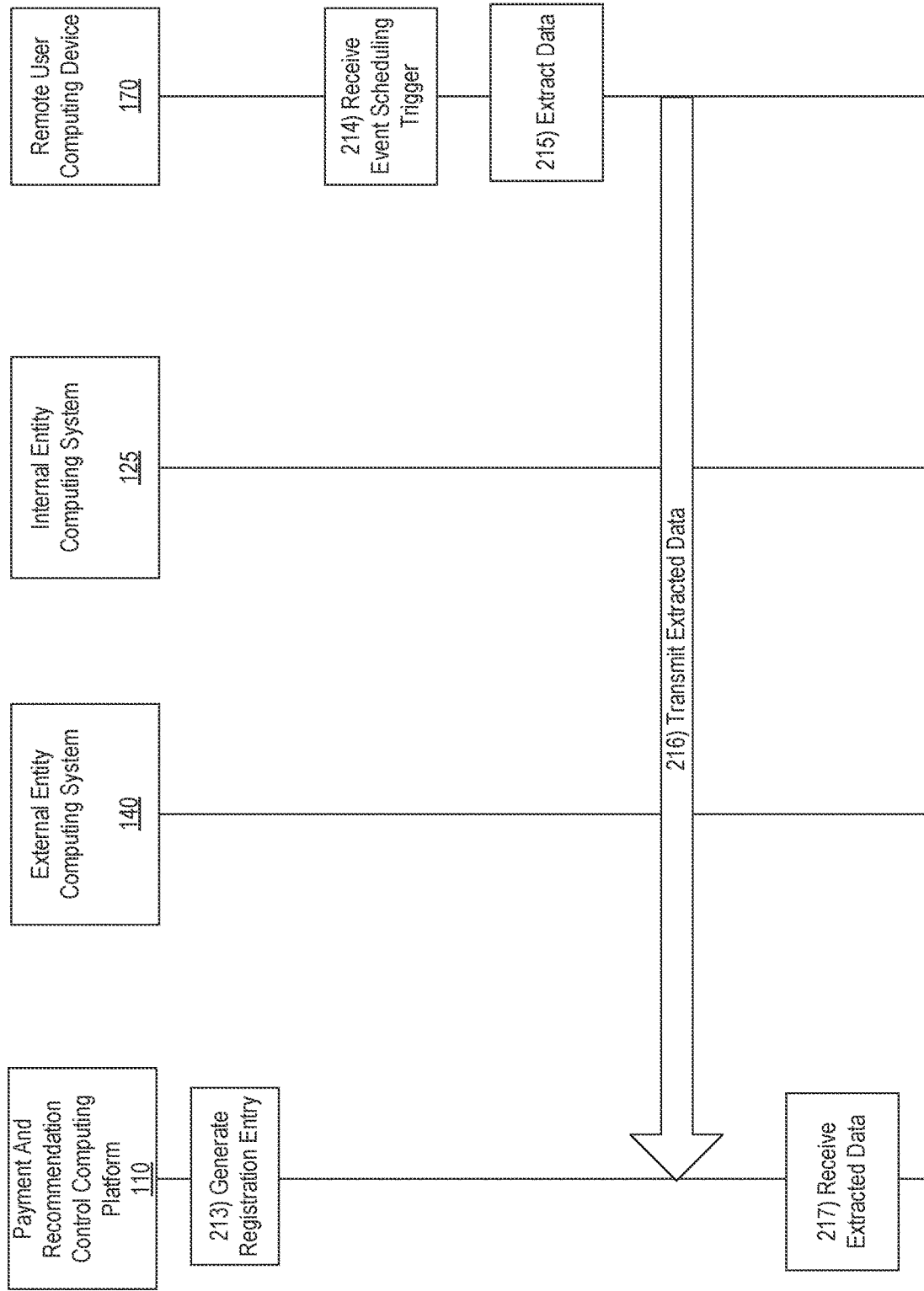

With reference to FIG. 2C, at step 213, payment and recommendation control computing platform 110 may generate a registration entry based on the received registration request and information. For instance, one or more databases may be updated to include the registration information received. In some examples, generating the registration entry may also include causing an application, such as a mobile banking application, to download to the remote user computing device 170. In other examples, the request for registration may be made via the application, such as a mobile banking application, downloaded to and executing on the remote user computing device 170.

At step 214, an event trigger may be received by the remote user computing device 170. For instance, an event trigger may include a digital calendar entry associated with an event (e.g., dinner with a friend, lunch with coworker, call for tree removal, or the like). Additionally or alternatively, an event trigger may include a request by a user (e.g., via the mobile banking or other application executing on the remote user computing device 170) to schedule or provide recommendations for dining locations, vendor services, or the like. Accordingly, in some examples, generating the recommendation may be performed automatically and without user input requesting the recommendation (e.g., based scheduling an event), while in other examples the recommendation may be generated in response to a user request for recommendation.

At step 215, the event trigger may initiate payment and recommendation processes and, in response, data may be extracted from one or more applications or the like executing on the remote user computing device 170. For instance, time and date of the scheduled event, type of event, other calendar events that may conflict, and the like, may be extracted. In some examples, extracted data may include social media data associated with the user and captured via one or more social media applications executing on the remote user computing device 170. In some examples, recent browser history may be extracted from one or more web browsers executing on the remote user computing device 170. The data may be extracted with permission of the user (e.g., in real-time or as a user preference provided upon registration).

At step 216, remote user computing device 170 may transmit the extracted data to the payment and recommendation control computing platform 110. In some arrangements, transmitting the extracted data may include transmitting the triggering event and/or event details. In some examples, an existing connection between the remote user computing device 170 and the payment and recommendation control computing platform 110 may be used to transmit the data. In other examples, a connection may be established and a communication session initiated to transmit the extracted data.

At step 217, payment and recommendation control computing platform 110 may receive the extracted data.

Figure 2D:
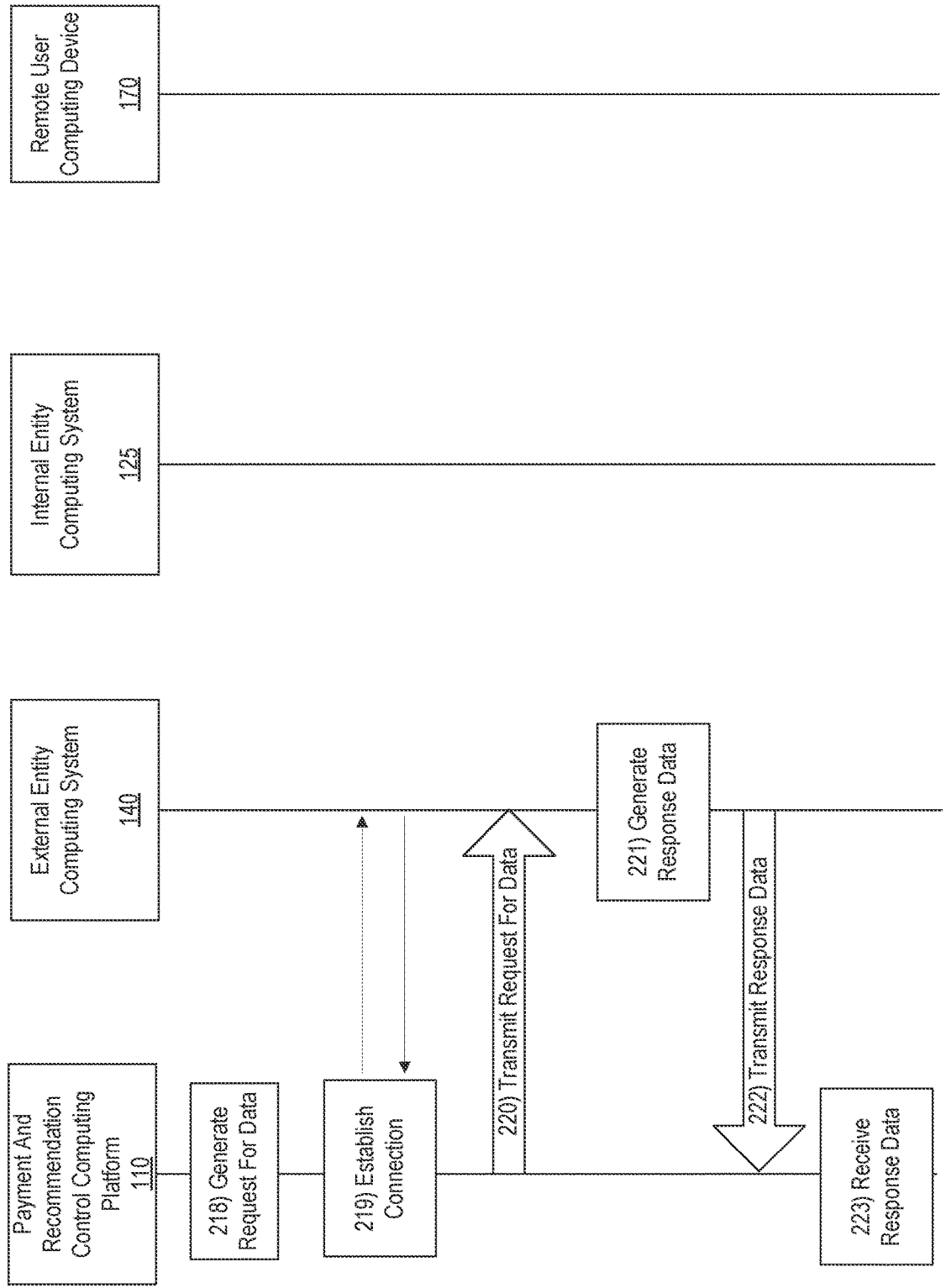

With reference to FIG. 2D, at step 218, in response to receiving the extracted data and/or event details, one or more requests for data may be generated by the payment and recommendation control computing platform 110. For instance, a request for availability data from one or more restaurants, vendors, or the like, may be generated. Additionally or alternatively, requests for user data stored by one or more external entities may be requested (e.g., social media platforms).

At step 219, a connection may be established between the payment and recommendation control computing platform 110 and external entity computing system 140. For instance, a third wireless connection may be established between the payment and recommendation control computing platform 110 and external entity computing system, 140. Upon establishing the third wireless connection, a communication session may be initiated between payment and recommendation control computing platform 110 and external entity computing system 140. Although a request for data from one external entity computing system 140 is shown, requests may be sent to a plurality of external entity computing systems, each associated with different external entities, without departing from the invention.

At step 220, the request for data may be transmitted by the payment and recommendation control computing platform 110 to the external entity computing system 140. For instance, the request for data may be transmitted during the communication session initiated upon establishing the third wireless connection.

At step 221, external entity computing system 140 may receive the request for data and may generate first response data. The first response data may include the requested data. At step 222, the first response data may be transmitted by the external entity computing system 140 to the payment and recommendation control computing platform 110.

At step 223, the payment and recommendation control computing platform 110 may receive the first response data.

With reference to FIG. 2E, at step 224, payment and recommendation control computing platform 110 may generate a request for data. The request for data may include a request for user account data, user preferences, user purchase history, and the like.

At step 225, the request for data may be transmitted by the payment and recommendation control computing platform 110 to the internal entity computing system 125. In some examples, the request may be transmitted via an existing connection and/or communication session. Alternatively, a new connection and communication session may be established and initiated.

At step 226, the request for data may be received by internal entity computing system 125 and second response data may be generated. The second response data may include the requested user data.

At step 227, the internal entity computing system 125 may transmit the generated second response data to the payment and recommendation control computing platform 110.

At step 228, the second response data may be received by the payment and recommendation control computing platform 110.

At step 229, all received data may be analyzed by the payment and recommendation control computing platform 110. For instance, the first response data, second response data, event details and extracted data may be analyzed (e.g., using machine learning) to generate one or more recommendations. For instance, one or more machine learning models may receive, as inputs, the received data and may be executed to generate one or more recommendations or outputs. In some examples, this process of data capture and analysis may be performed without user input requesting the recommendation generation and, instead, may be based on a triggering event such as a calendar entry.

Figure 2F:
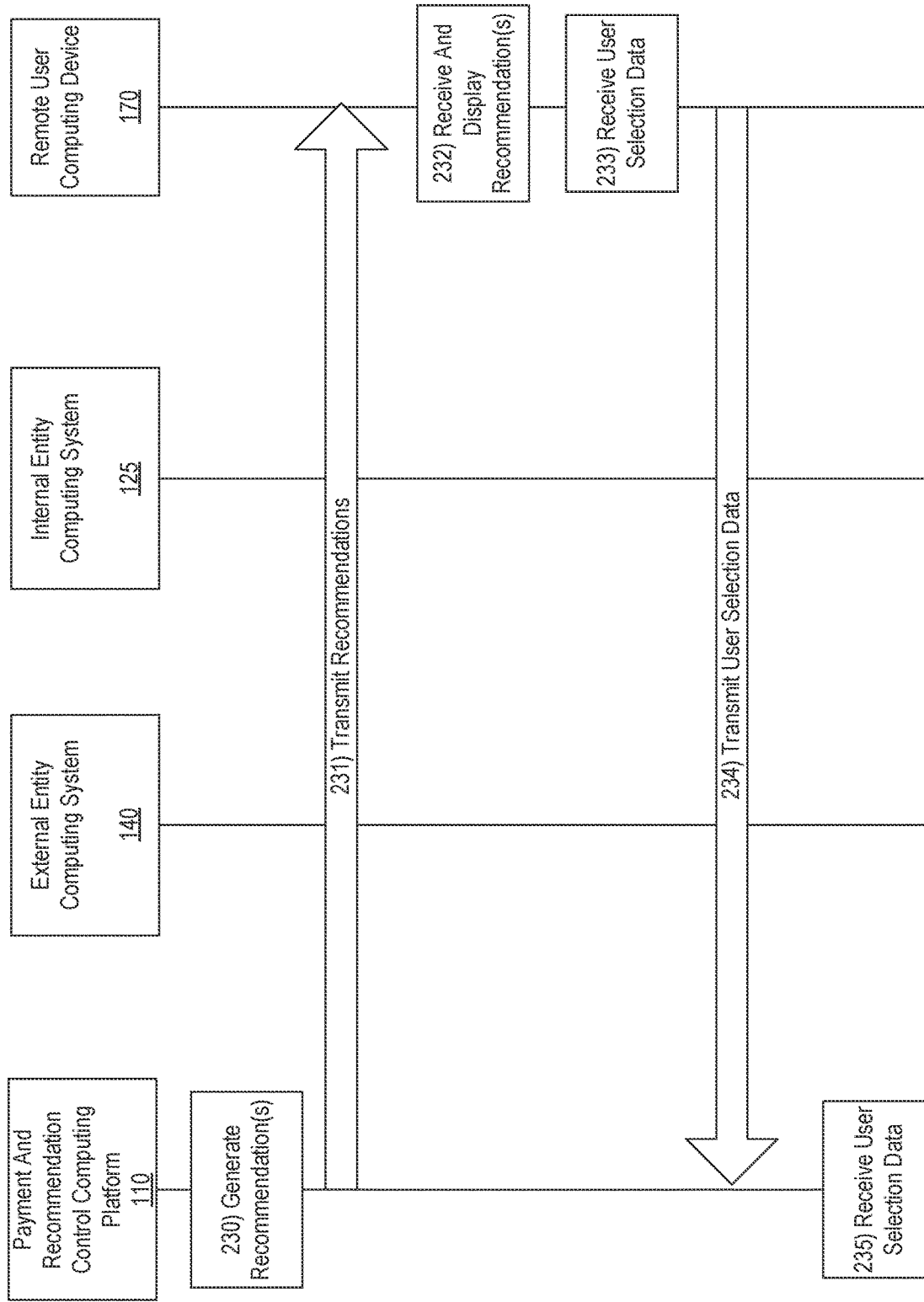

With reference to FIG. 2F, at step 230, the one or more recommendations may be generated or output by the machine learning model. In some examples, the recommendations may include a plurality of restaurants recommended for the user and available for selection. In other examples, the recommendations may include a plurality of vendors or service providers available for selection. While the example described includes generating a plurality of recommendations, in some examples, a single recommendation may be generated. In some arrangements, the payment and recommendation control computing platform 110 may automatically implement or execute (e.g., schedule a reservation, commit to a vendor, or the like) the one recommendation (e.g., without user input). Arrangements for automatically executing a single recommendation may be based on user preferences (e.g., provided at registration).

At step 231, the generated recommendations may be transmitted to the remote user computing device 170 (e.g., in arrangements in which a recommendation is not automatically executed).

Figure 5:
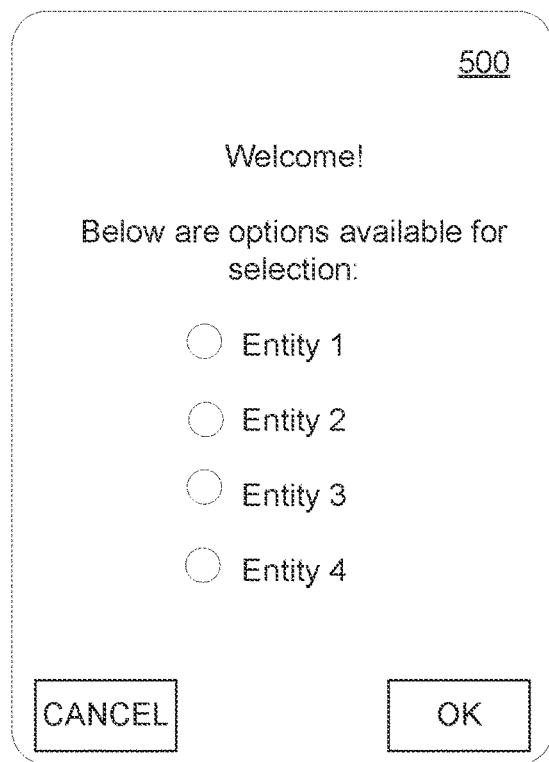
FIGS. 5 and 6 illustrate example user interfaces that may be generated in accordance with one or more aspects described herein.

At step 232, the recommendations may be received and displayed by the remote user computing device 170. FIG. 5 illustrates one example user interface 500 displaying the one or more recommendations available for selection. Although four entities are shown in FIG. 5, more or fewer options may be identified and displayed without departing from the invention. As shown in the interface 500, each entity is associated with a radio button which may be selected by a user. Various other types of selection may be used without departing form the invention.

At step 233, user input selecting one of the recommendations may be received. For instance, a user may select (e.g., via an input device, touch screen, or the like) one of the recommendations displayed. User selection data may be generated based on the selection made.

At step 234, the remote user computing device 170 may transmit the user selection data to the payment and recommendation control computing platform 110. At step 235, payment and recommendation control computing platform 110 may receive the user selection data.

Figure 2G:
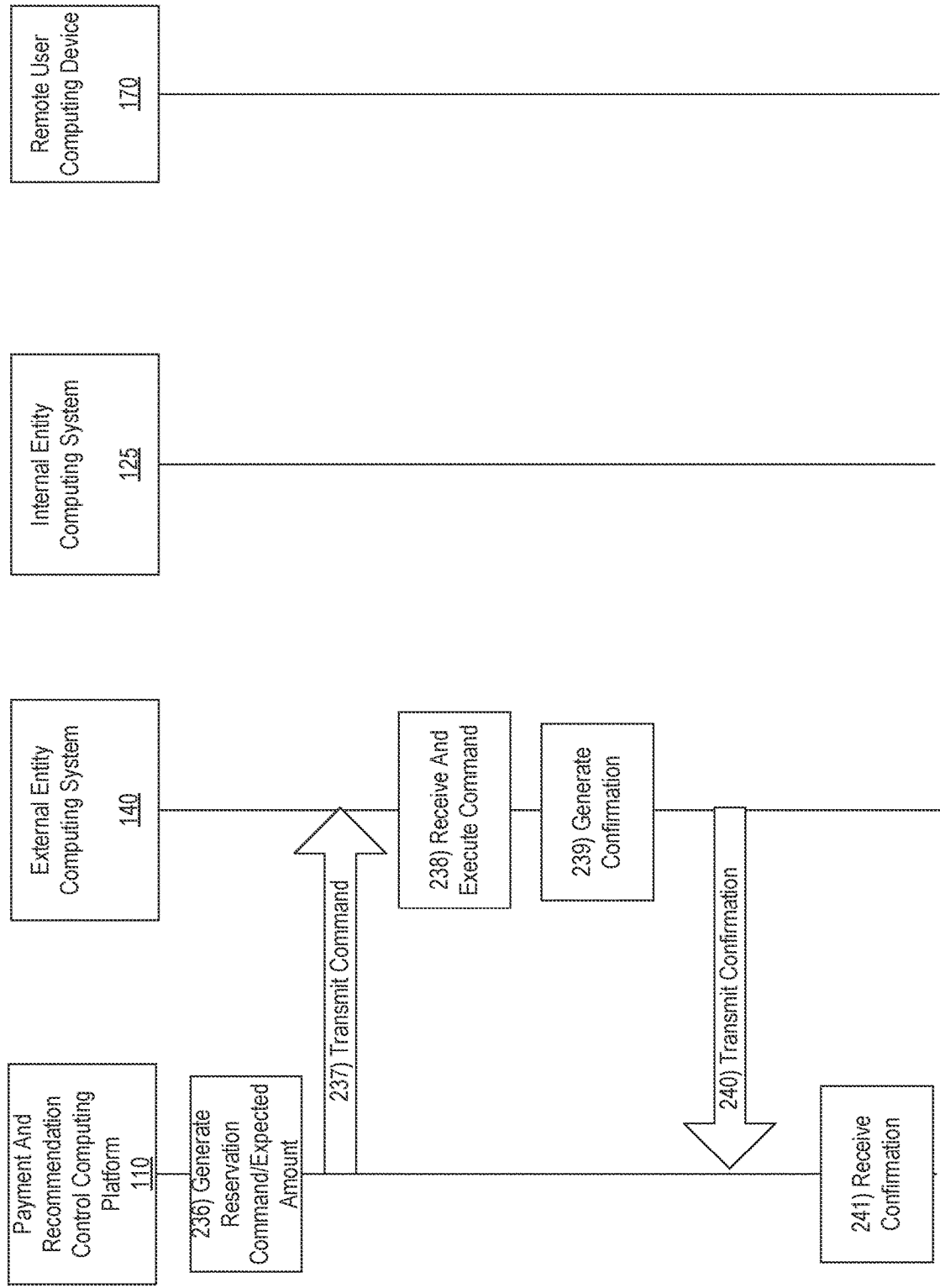

With reference to FIG. 2G, at step 236, based on the received user selection data, an expected amount associated with the event (e.g., cost of meal, cost of vendor service, or the like) may be generated and one or more instructions or commands to execute a scheduling process may be generated. In some examples, the expected amount may be based on previous meals or service at a same or similar establishment. The generated instruction or command to execute a scheduling process may include event details such as time, date, number of people, type of service, and the like.

At step 237, the generated instruction or command to execute a scheduling process may be transmitted to the external entity computing system 140. For instance, in examples in which data is received from a plurality of external entity computing systems, instruction or command may be transmitted to the external entity computing system 140 associated with the user selected entity.

At step 238, the external entity computing system 140 may receive and execute the command or instruction. For instance, if the command or instruction includes scheduling a reservation, the reservation may be scheduled for a time and number of people included in the instruction.

At step 239, based on the executed instruction or command, external entity computing system 140 may generate a confirmation of the scheduled event. At step 240, the external entity computing system 140 may transmit the generated confirmation to the payment and recommendation control computing platform 110.

At step 241, the confirmation may be received by the payment and recommendation control computing platform 110.

Figure 2H:
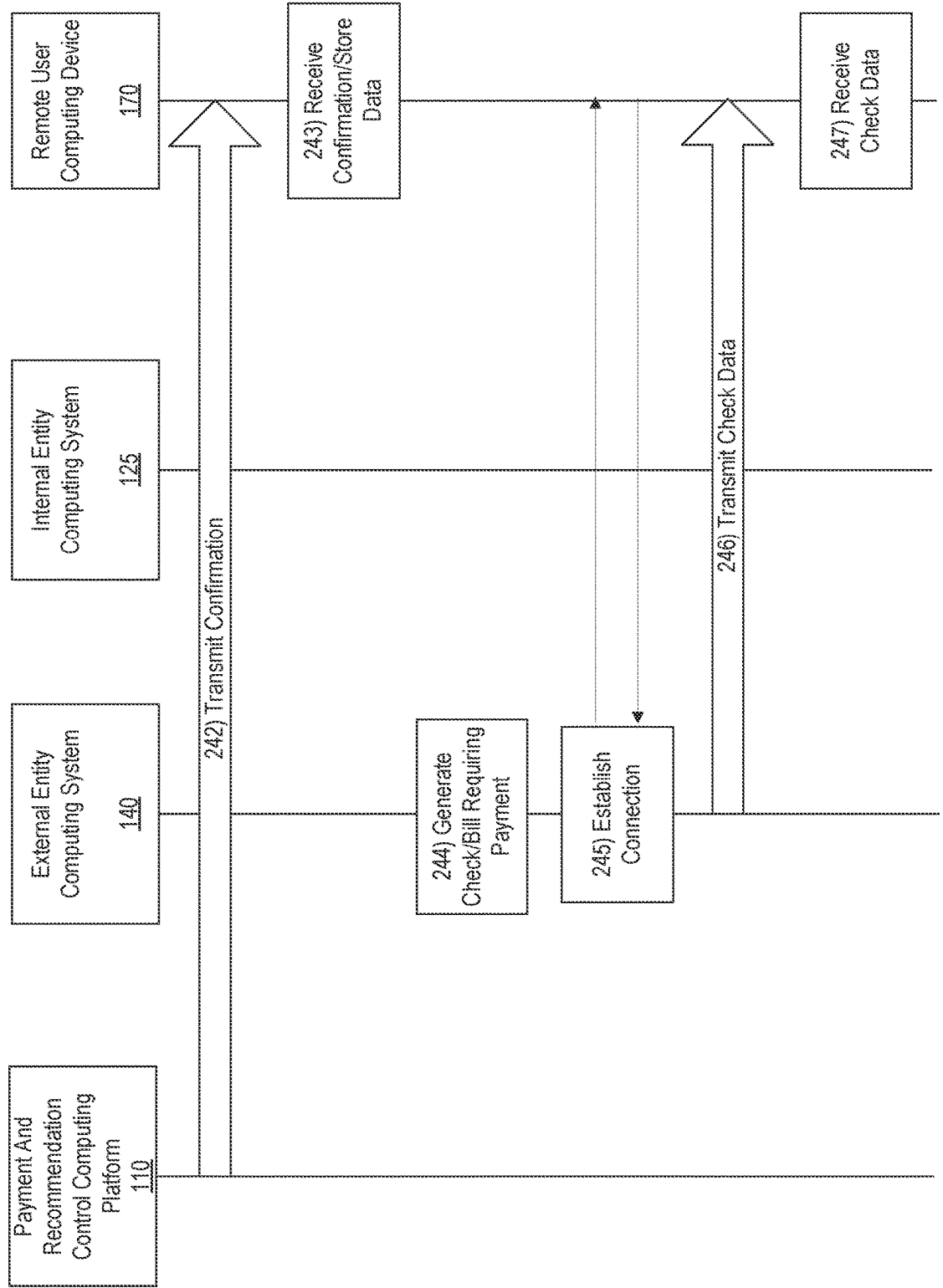

With reference to FIG. 2H, at step 242, the confirmation may be transmitted to the remote user computing device 170. In some examples, transmitting the confirmation may include transmitting an instruction to update a calendar appointment of the user to include the data associated with the confirmed event (e.g., time, date, location, and the like).

At step 243, the confirmation may be received by remote user computing device 170 and details of the event may be stored by remote user computing device 170 (e.g., in a calendar application executing on the device 170, in a database of the device, or the like).

At step 244, a check or bill associated with the event may be generated by the external entity computing system 140. For instance, upon completing a meal associated with a restaurant reservation, a check or bill for the amount due may be generated. In some examples, the check or bill may include an itemized listing of the purchases made by the user. In other examples, the check may include a final amount, which may or might not include a gratuity.

At step 245, a connection may be established between the external entity computing system 140 and remote user computing device 170. For instance, a fourth wireless connection may be established between the external entity computing system 140 and remote user computing device 170. Upon establishing the fourth wireless connection, a communication session may be initiated between external entity computing system 140 and remote user computing device 170.

At step 246, the check or bill data may be transmitted by external entity computing system 140 to the remote user computing device 170. For instance, the check or bill data may be transmitted during the communication session initiated upon establishing the fourth wireless connection. In some examples, transmitting the check or bill data may include transmitting data embedded in the check or bill (e.g., restaurant name, location, amount, date, time, and the like). Additionally or alternatively, transmitting the check or bill data may include transmitting an image of a check (e.g., captured by the external entity computing system 140).

At step 247, the check or bill data may be received by the remote user computing device 170.

Figure 2I:
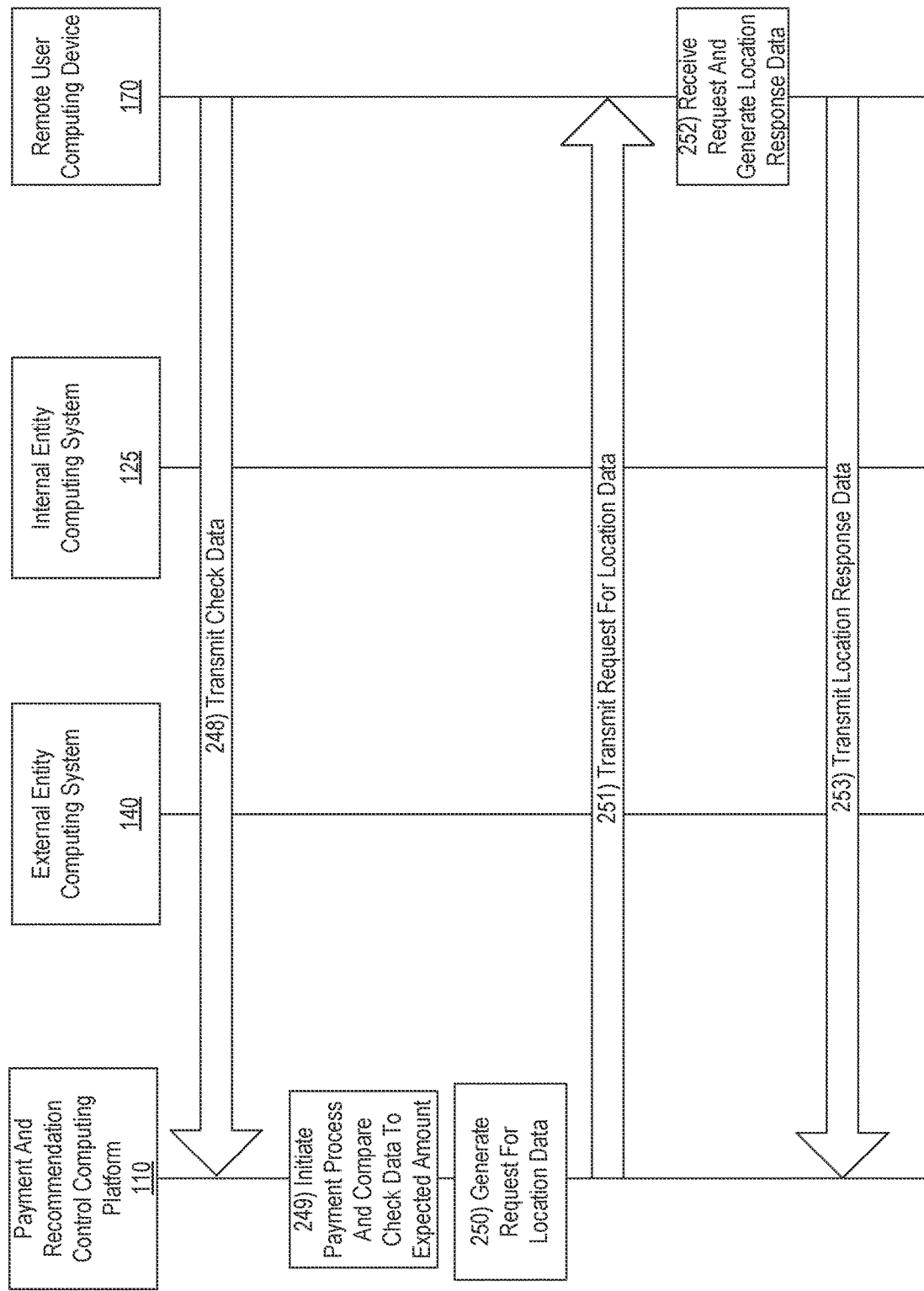

With reference to FIG. 2I, at step 248, the check or bill data received by the remote user computing device 170 may be transmitted to the payment and recommendation control computing platform 110 for analysis. For instance, an application executing on remote user computing device, such as a mobile banking application provided by the enterprise organization implementing the payment and recommendation control computing platform 110, may transmit the received check or bill data to the payment and recommendation control computing platform 110. In some examples, the check or bill data may be received and/or transmitted without user interaction (e.g., automatically and without user input).

At step 249, the payment and recommendation control computing platform 110 may receive the check or bill data and initiate payment evaluation and processing. For instance, the check or bill data may be received and analyzed. In some examples, if the received check or bill data includes image data, optical character recognition may be used to extract data, such as restaurant name, location, time, date, amount, and the like, from the image data. Additionally or alternatively, a quick response (QR) or other machine readable code may be provided on the bill and read to identify bill or event data. Once an amount associated with the check or bill is identified, the amount may be compared to the pre-determined expected or predicted amount generated by the payment and recommendation control computing platform 110. If the amount associated with the check or bill is less than or equal to the expected or predicted amount, the check may be eligible for automatic processing (e.g., the check may be processed without user input or interaction). In some examples, if the amount associated with the check or bill is above the pre-determined expected amount within a predefined range (e.g., 5%, 10% or the like), the system may consider the amount to be eligible for automatic processing. If the check or bill is not eligible for automatic processing, a request for input may be transmitted to the user. The request may include a request to authorize payment and, upon receiving payment authorization, the process may continue at step 255.

If the check or bill is eligible for automatic processing, a request for current location data may be generated by the payment and recommendation control computing platform 110 at step 250. The location data may be used to confirm or authorize the automatic payment.

At step 251, the request for location data may be transmitted by the payment and recommendation control computing platform 110 to the remote user computing device 170. In some examples, the request may be transmitted via the application (e.g., mobile banking application) executing on the user device.

At step 252, the remote user computing device 170 may receive the request for location data and may generate location response data. The location response data may be generated based on global positioning system (GPS) data captured by a GPS system on the remote user computing device 170.

At step 253, the remote user computing device 170 may transmit the location response data to the payment and recommendation control computing platform 110.

Although arrangements shown include a request for location data, in some examples, payment and recommendation control computing platform 110 may continuously (or at predetermined intervals) receive location data from the remote user computing device 170. Accordingly, a location of the remote user computing device 170 may be known to the payment and recommendation control computing platform 110 and used to authorize transaction processing.

Figure 2J:
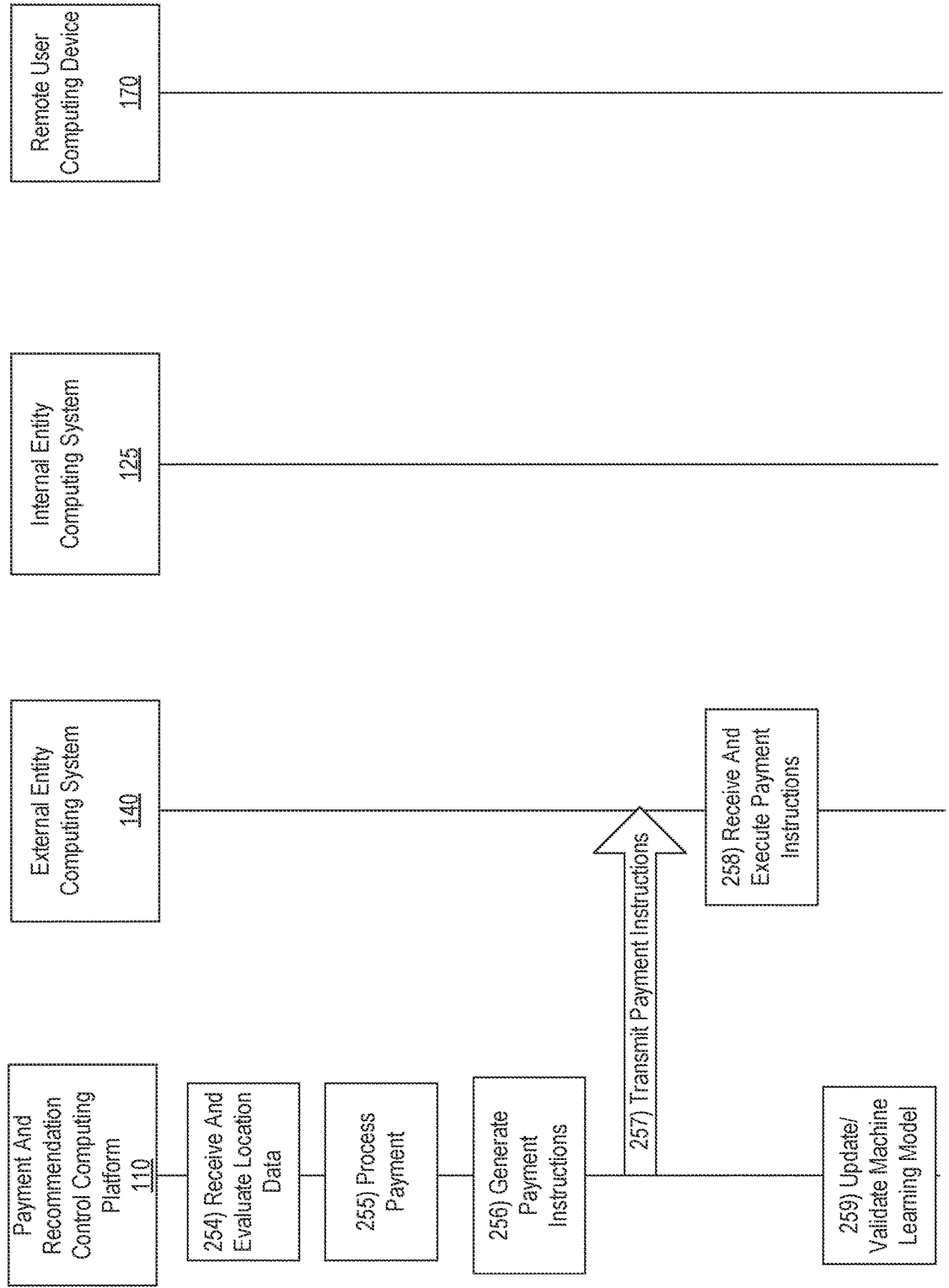

With reference to FIG. 2J, at step 254, the payment and recommendation control computing platform 110 may receive and evaluate the location response data. For instance, the payment and recommendation control computing platform 110 may compare the location response data (indicating a current location of the remote user computing device 170 of the user) to an expected location based on, e.g., the reservation scheduled by the payment and recommendation control computing platform 110, the user selection of a recommendation, calendar data of the user, or the like and/or the event data indicating a location of the restaurant, vendor, or the like requesting payment. If the location response data does not match the expected location data and event location data, a notification may be transmitted to the user requesting authorization to process payment and, upon receiving authorization, the payment may be processed at step 255.

Upon confirming that the location response data matches an expected location and the event location data, the payment may be processed at step 255. For instance, without user input or interaction, based on the payment being authorized by comparing location response data to expected location data and event location data, payment of the check or bill may be processed. In some examples, processing the payment may include selecting a payment device associated with the user from a plurality of payment modes or devices (e.g., different credit cards, debit card, or the like). In some examples, a user may pre-select a payment device. In some arrangements, the user may select different payment devices for different types of payments, different amounts, and the like. Additionally or alternatively, payment and recommendation control computing platform 110 may automatically select a payment device (e.g., based on historical data, amount, account closing date, account balance, or the like). Automatic selection of a payment device or mode may be based on contextual data, event data, and the like.

At step 256, one or more payment instructions may be generated. For instance, instructions to process a payment, transfer funds from one account to another account or entity, update an account ledger, and the like, may be generated.

At step 257, the generated one or more payment instructions may be transmitted to external entity computing system 140. For instance, an instruction to process payment for the bill, an account or payment device to process the payment, an amount of payment, and the like, may be transmitted to the external entity computing system 140.

At step 258, the external entity computing system 140 may receive the one or more payment instructions and may execute the instructions. In some examples, executing the instructions may include transmitting and/or receiving data with a financial institution (e.g., associated with the payment device or account of the user) to update account information, record the transaction in a ledger, and the like.

At step 259, one or more machine learning models may be updated and/or validated. For instance, based on the automatic payment of the bill, an amount being over or under an expected amount, user selection data received related to options or recommendations provided for selection, and the like, the payment and recommendation control computing platform 110 may update and/or validate the one or more machine learning models. Accordingly, the one or more machine learning models may be continuously refined and accuracy continuously improved.

Figure 2K:
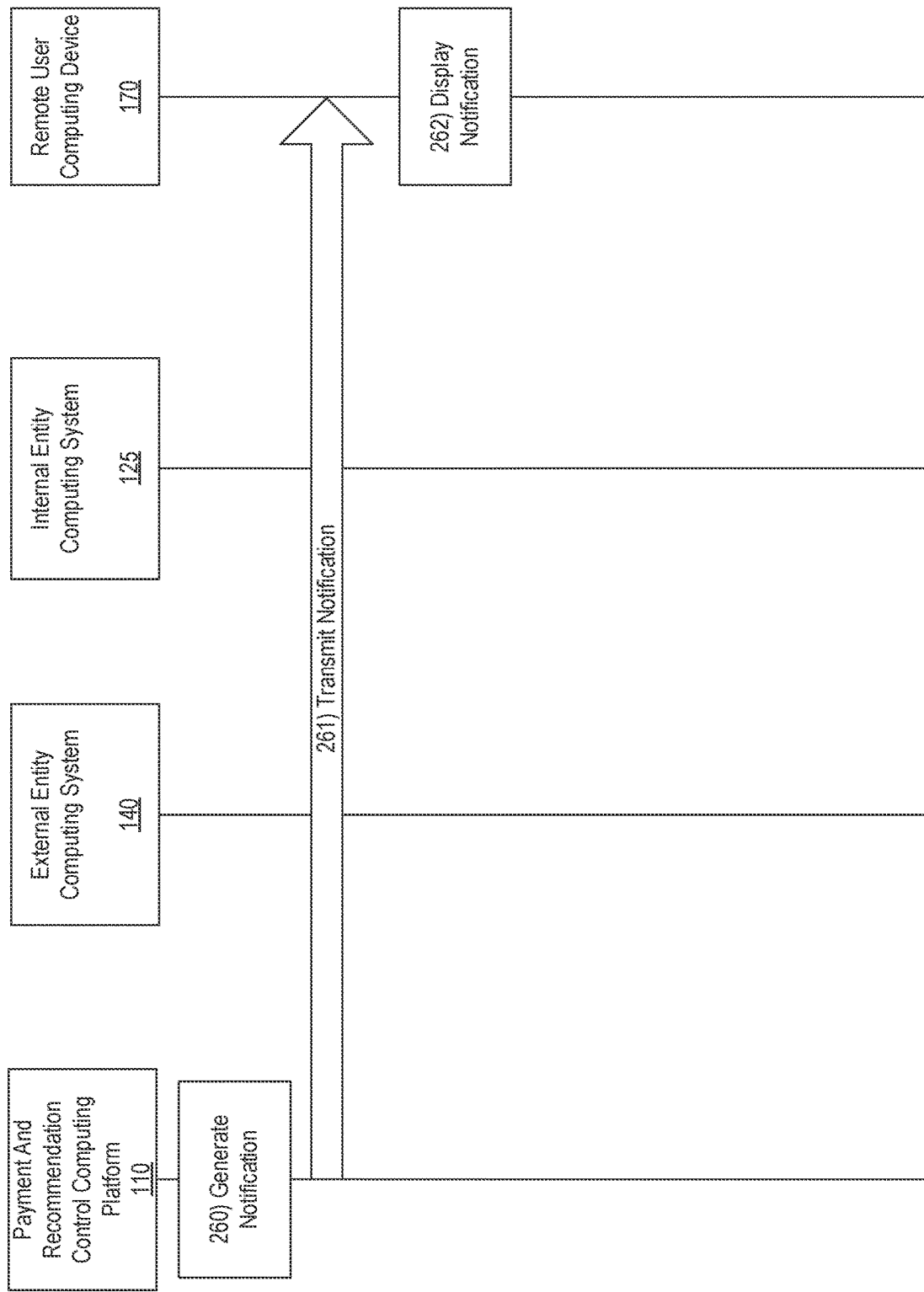
Figure 6:
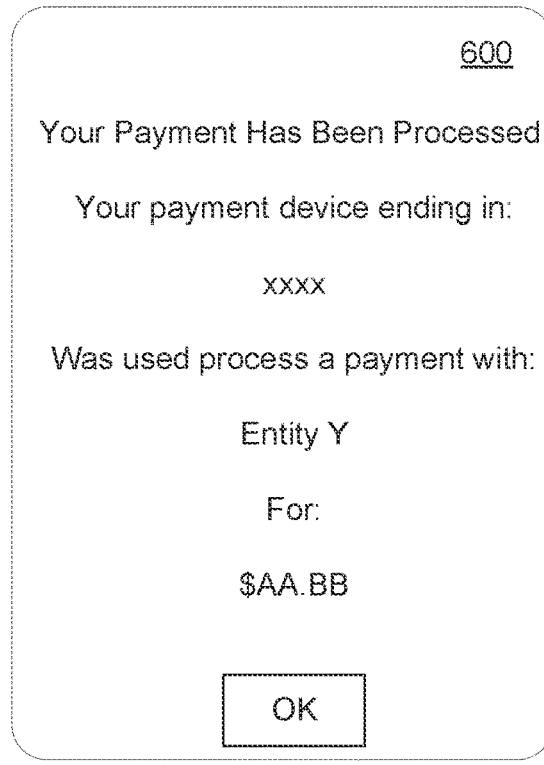

With reference to FIG. 2K, at step 260, one or more notifications indicating that the bill has been paid (or other transaction processed) may be generated by the payment and recommendation control computing platform. For instance, FIG. 6 illustrates one example user interface 600 that may be generated. The user interface 600 includes an indication that a payment was processed, the entity with which it was processed and an amount. The information shown in interface 600 is merely one example arrangement. More information may be provided via the user interface without departing from the invention.

At step 261, the generated notification may be transmitted to remote user computing device 170. At step 262, the notification may be received by remote user computing device 170 and displayed by a display of remote user computing device 170.

Figure 3:
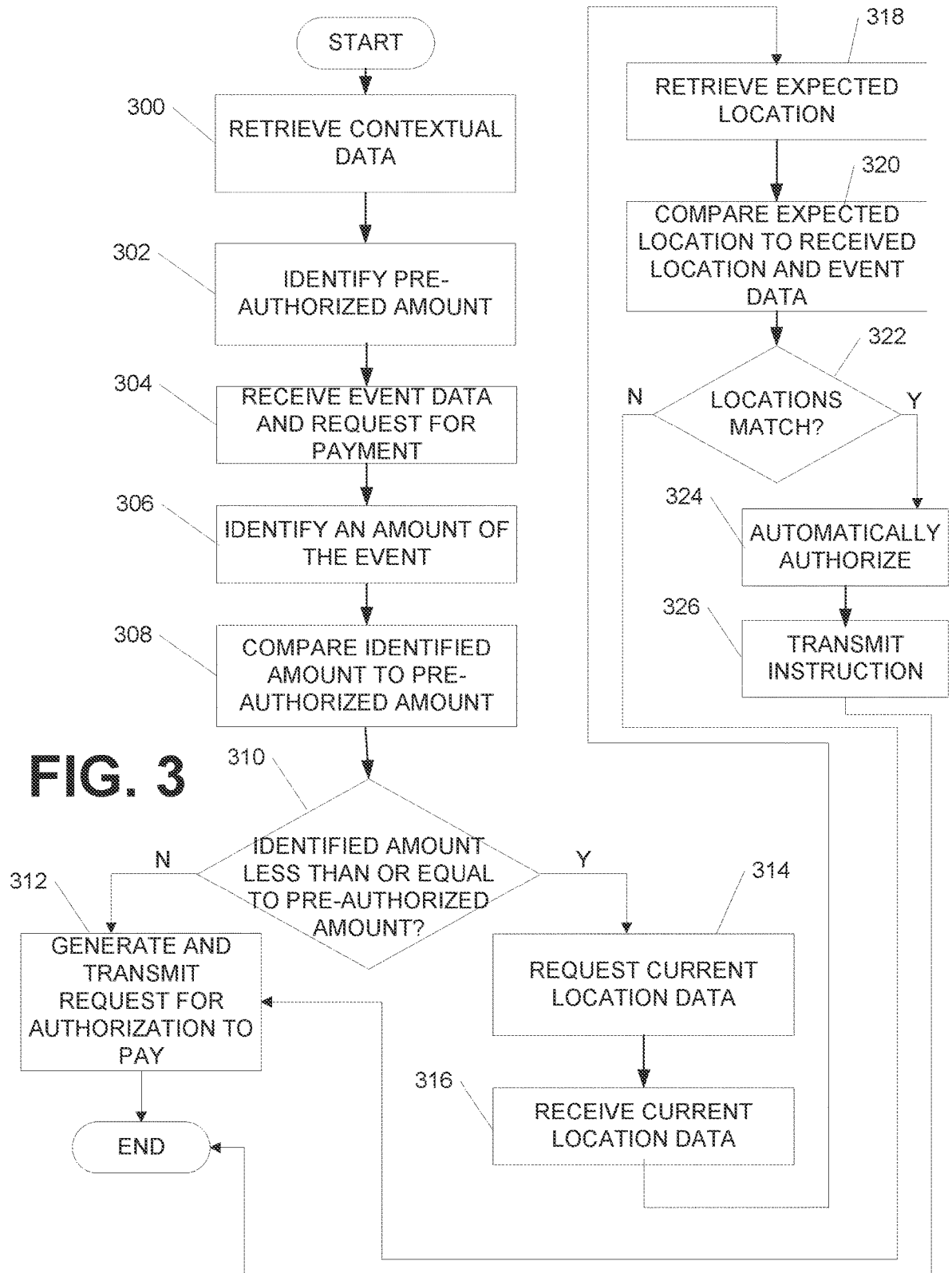
FIG. 3 illustrates one example method for implementing payment and recommendation control functions in accordance with one or more aspects described herein.

FIG. 3 is a flow chart illustrating one example method of implementing payment and recommendation control functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, contextual data associated with a user may be received from one or more sources. In some examples, the contextual data may be calendar data including scheduled events of the user, locations of the events, and the like.

At step 302, a pre-authorized amount for an event may be determined. For instance, based on the contextual data, an amount to pre-authorize for payment at an event may be identified. In some examples, the pre-authorized amount may be identified or determined by executing one or more machine learning models to generate a pre-authorized amount based on, for instance, the event location, time or date of event, number of people at the event, prior user experience for a same or similar event, and the like.

At step 304, event data and a request for payment may be received by payment and recommendation control computing platform 110. For instance, event data and a request for payment may be received from an external entity computing system 140 associated with an entity hosting the event (e.g., the restaurant at which the user is dining, a vendor or service provider working with the user, and the like). In some examples, the event data may include a check or bill for payment due. In some arrangements, the event data may include an image or image data of the check or bill. The event data may further include a location of the event, a date of the event, a time of the event, and the like.

At step 306, an amount of the event may be determined. For instance, a requested payment amount may be determined from the event data. In some examples, optical character recognition may be used to analyze the image data to determine the amount of the event and/or other event data such as location data, and the like.

At step 308, the identified amount may be compared to the pre-authorized amount to determine whether the identified amount is less than or equal to the pre-authorized amount.

At step 310, a determination may be made, based on the comparing, as to whether the identified amount is less than or equal to the pre-authorized amount. If not, at step 312, a request for user input authorizing payment of the event may be generated and transmitted to, for instance, remote user computing device 170.

If, at step 310, the identified amount is less than or equal to the pre-authorized amount, at step 314, a request for current location data of a user device, such as remote user computing device 170, may be generated and transmitted to the remote user computing device 170.

At step 316, current location data may be received from the remote user computing device 170. For instance, global positioning data form the remote user computing device 170 may be transmitted to and received by the payment and recommendation control computing platform 110.

At step 318, expected location data may be retrieved. For instance, the received contextual data may be analyzed to determine an expected location of the user (e.g., based on calendar data, or the like).

At step 320, the expected location data may be compared to the current location data and event data (e.g., a location of the entity requesting payment for the event) to determine whether there is a match. For instance, an expected location from, for instance, calendar data may be compared to a location determined from the received event data and the current GPS data to determine whether the locations match.

If, at step 322, and based on the comparing, the locations do not match, the process may continue to step 312 and a request for authorization may be generated and transmitted to remote user computing device 170.

If, at step 322, the locations do match (e.g., all three locations are the same) the requested payment may be automatically authorized (e.g., without user input or interaction) at step 324.

At step 326, one or more instructions to process payment may be generated and transmitted to, for instance, external entity computing system 140 (e.g., the entity requesting payment) for execution and processing.

Although arrangements described include comparing three locations and all three locations matching to authorize processing, in some examples, more or fewer locations may be compared without departing from the invention. Further, in some examples, fewer than all available location data points may match in order to automatically authorize processing (e.g., entity location data may match current user location data, or the like) without departing from the invention.

Figure 4:
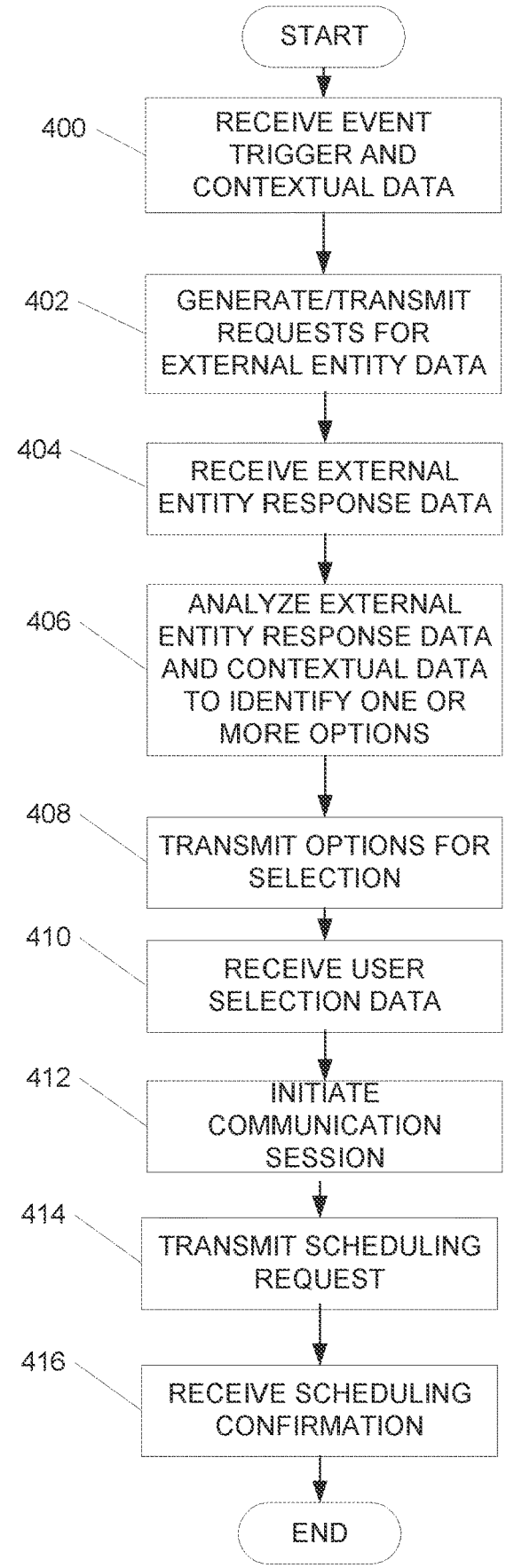
FIG. 4 illustrates another example method for implementing payment and recommendation control functions in accordance with one or more aspects described herein.

FIG. 4 is a flow chart illustrating another example method of implementing payment and recommendation control functions according to one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 4 may be performed in real-time or near real-time.

At step 400, an event trigger and contextual data may be received by the payment and recommendation control computing platform 110. For instance, an event trigger such as a user adding an entry to a digital calendar may be received and contextual data of the user may be received. In some examples, the event trigger and contextual data may be received from a user computing device, such as remote user computing device 170, which may include a smartphone, smart watch, fitness tracker or other wearable device, or the like. In some examples, the contextual data may include data associated with the event (e.g., time, date, and the like). In some arrangements, contextual data may include wellness data of the user (e.g., from a fitness tracker), social media or browsing history of the user, previous purchase history of the user, and the like. The data may be received from the user computing device with permission of the user.

At step 402, one or more requests for external entity data may be generated and transmitted to one or more external entity computing systems. For instance, a plurality of requests for data from restaurants, vendors, service providers, or the like, that may be scheduled for the event may be generated and transmitted to a plurality of external entity computing systems associated with different external entities.

At step 404, external entity response data may be received. For instance, external entity response data may be received from one or more external entity computing systems to which requests for data were transmitted.

At step 406, the external entity response data and contextual data may be analyzed, using one or more machine learning models, to generate one or more recommended options available for user selection. The one or more recommended options available for user selection may include one or more entities available to schedule the event.

At step 408, the generated one or more recommended options may be transmitted to the remote user computing device for display on the device.

At step 410, user input selecting a first recommended option of the one or more recommended options may be received from remote user computing device.

At step 412, responsive to receiving the user input selecting the first recommended option, a communication session may be initiated between the payment and recommendation control computing platform 110 and a first external entity computing system associated with an entity associated with the selected first recommended option.

At step 414, a request to schedule the event may be generated and transmitted by the payment and recommendation control computing platform 110 to the first external entity computing system.

At step 416, a confirmation of scheduling may be received from the first external entity computing system.

Accordingly, aspects described herein provide for seamless, intelligent recommendation generation and payment processing that, in some examples, may be performed without user input. Accordingly, the system may evaluate user contextual data to facilitate recommendation generation and/or payment processing that may be performed in a background or without user input. For instance, a user may eat at a restaurant and leave when the meal is finished because the bill may be paid without input from the user. The user may receive a notification (e.g., via email, SMS, or the like) indicating that the bill has been paid.

Although various examples are described in the context of making a restaurant reservation and paying a bill at the restaurant, aspects described herein may be used in a variety of instances including arrangements with various types of merchants or vendors, service providers, and the like, without departing from the invention.

As discussed herein, location data (e.g., expected location from contextual data, current location from GPS data, entity location from event data, and the like) may be used to authenticate the user and authorize payment. In some examples, in addition to location data, time and date information from the contextual data may be compared to current time and date information, time and date information from the bill or event, and the like, to further authenticate the user, authorize payment and ensure the payment is not unauthorized or mistakenly made.

In some examples, even if amount is not less than pre-authorized amount, payment may be automatically authorized using additional authentication data. For instance, in some arrangements, additional contextual data may be used to authenticate the user and authorize payment even if over threshold amount (e.g., if within an expected range).

Figure 7:
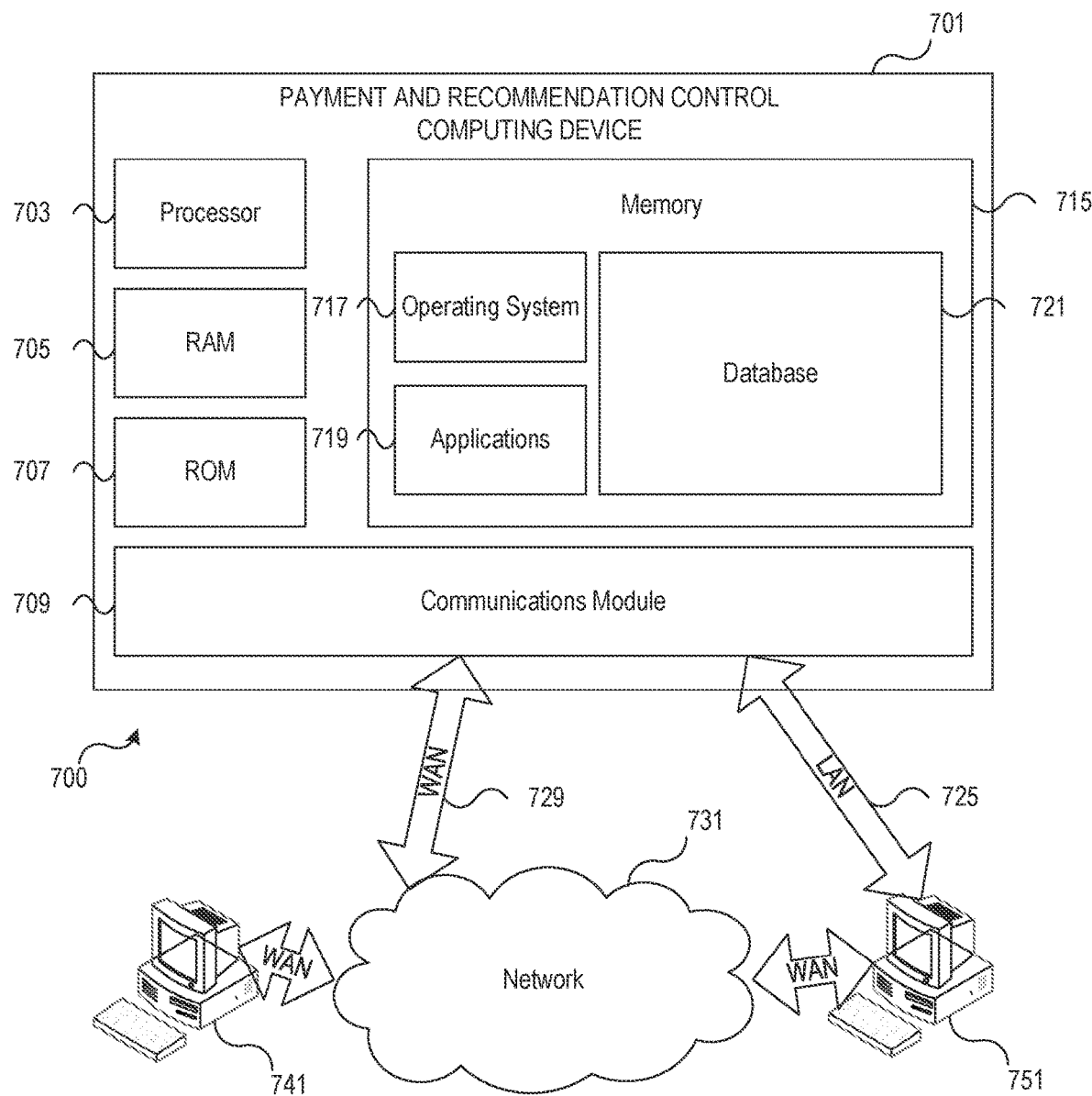
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments.

Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include payment and recommendation control computing device 701 having processor 703 for controlling overall operation of payment and recommendation control computing device 701 and its associated components, including Random Access Memory (RAM) 705, Read-Only Memory (ROM) 707, communications module 709, and memory 715. Payment and recommendation control computing device 701 may include a variety of computer readable media. Computer readable media may be any available media that may be accessed by payment and recommendation control computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by resource optimization and control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on payment and recommendation control computing device 701. Such a processor may execute computer-executable instructions stored on a computer-readable medium.

Software may be stored within memory 715 and/or storage to provide instructions to processor 703 for enabling payment and recommendation control computing device 701 to perform various functions as discussed herein. For example, memory 715 may store software used by payment and recommendation control computing device 701, such as operating system 717, application programs 719, and associated database 721. Also, some or all of the computer executable instructions for payment and recommendation control computing device 701 may be embodied in hardware or firmware. Although not shown, RAM 505 may include one or more applications representing the application data stored in RAM 705 while payment and recommendation control computing device 701 is on and corresponding software applications (e.g., software tasks) are running on payment and recommendation control computing device 701.

Communications module 709 may include a microphone, keypad, touch screen, and/or stylus through which a user of payment and recommendation control computing device 701 may provide input, and may also include one or more of a speaker for providing audio output and a video display device for providing textual, audiovisual and/or graphical output. Computing system environment 700 may also include optical scanners (not shown).

Payment and recommendation control computing device 701 may operate in a networked environment supporting connections to one or more remote computing devices, such as computing devices 741 and 751. Computing devices 741 and 751 may be personal computing devices or servers that include any or all of the elements described above relative to payment and recommendation control computing device 701.

The network connections depicted in FIG. 7 may include Local Area Network (LAN) 725 and Wide Area Network (WAN) 729, as well as other networks. When used in a LAN networking environment, payment and recommendation control computing device 701 may be connected to LAN 725 through a network interface or adapter in communications module 709. When used in a WAN networking environment, payment and recommendation control computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and
    a memory storing computer-readable instructions that, when executed by the at least one processor, cause the computing platform to:
        receive historical data of a user;
        train, using the historical data of the user, a machine learning model to identify patterns within user data to generate predicted pre-authorized amounts and recommendations;
        retrieve contextual data for a user from at least one user source;
        execute the machine learning model, wherein executing the machine learning model includes using, as inputs, the retrieved contextual data to output a pre-authorized amount for payment for an event using automatic payment processing;
        receive, from an entity computing system, a request for payment and data associated with the event;
        identify, from the data associated with the event, an amount for the event;
        compare the identified amount to the pre-authorized amount output by the machine learning model;
        responsive to determining that the identified amount is less than or equal to the pre-authorized amount:
            request, from a user computing device and in real-time, current location data of the user;
            receive, from the user computing device and in real-time, global positioning system (GPS) data of the user indicating the current location data of the user;
            retrieve, from the contextual data, an expected location of the user;
            compare the expected location of the user to the current location data of the user and location data from the data associated with the event;
            responsive to determining that the current location data matches the expected location of the user and the data associated with the event;
                authorize payment of the amount for the event; and
                update the machine learning model based on the authorized payment; and
                transmit, to the entity computing system, an instruction authorizing payment of the amount for the event;
            responsive to determining that the current location data does not match the expected location of the user and the location data from the data associated with the event, generate and transmit, to the user computing device, a request to authorize payment of the amount for the event; and
        responsive to determining that the identified amount is more than the pre-authorized amount, generate and transmit, to the user computing device, a request to authorize payment of the amount for the event.

2. The computing platform of claim 1, wherein authorizing payment for the amount of the event is performed without user input.

3. The computing platform of claim 1, wherein the data associated with the event includes a check or bill including event data including a location of the event, a time of the event, and a date of the event.

4. The computing platform of claim 3, wherein the data associated with the event includes an image of the check or bill.

5. The computing platform of claim 4, wherein identifying, from the data associated with the event, an amount for the event is performing by analyzing the image using optical character recognition.

6. The computing platform of claim 1, wherein the contextual data includes calendar data of the user.

7. The computing platform of claim 1, wherein the at least one user source is at least one of: a smartphone of a user and a wearable device of the user.

8. A method, comprising:
    receiving, by a computing platform, the computing platform having at least one processor and memory, historical data of a user;
    training, by the at least one processor and using the historical data of the user, a machine learning model to identify patterns within user data to generate predicted pre-authorized amounts and recommendations;
    retrieving, by the at least one processor, contextual data for a user from at least one user source;
    executing, by the at least one processor, the machine learning model, wherein executing the machine learning model includes using, as inputs, the retrieved contextual data to output a pre-authorized amount for payment for an event using automatic payment processing;
    receiving, by the at least one processor and from an entity computing system, a request for payment and data associated with the event;
    identifying, by the at least one processor and from the data associated with the event, an amount for the event;
    comparing, by the at least one processor, the identified amount to the pre-authorized amount output by the machine learning model;
    when it is determined that the identified amount is less than or equal to the pre-authorized amount:
        requesting, by the at least one processor and from a user computing device and in real-time, current location data of the user;
        receiving, by the at least one processor and from the user computing device and in real-time, global positioning system data of the user indicating the current location data of the user;
        retrieving, by the at least one processor and from the contextual data, an expected location of the user;
        comparing, by the at least one processor, the expected location of the user to the current location data of the user and location data from the data associated with the event;

when it is determined that the current location data matches the expected location of the user and the data associated with the event;
authorizing, by the at least one processor, payment of the amount for the event;
updating, by the at least one processor, the machine learning model based on the authorized payment; and
transmitting, by the at least one processor and to the entity computing system, an instruction authorizing payment of the amount for the event;
when it is determined that the current location data does not match the expected location of the user and the location data from the data associated with the event, generating and transmitting, by the at least one processor and to the user computing device, a request to authorize payment of the amount for the event; and
when it is determined that the identified amount is more than the pre-authorized amount, generating and transmitting, by the at least one processor and to the user computing device, a request to authorize payment of the amount for the event.

9. The method of claim 8, wherein authorizing payment for the amount of the event is performed without user input.

10. The method of claim 8, wherein the data associated with the event includes a check or bill including event data including a location of the event, a time of the event, and a date of the event.

11. The method of claim 10, wherein the data associated with the event includes an image of the check or bill.

12. The method of claim 11, wherein identifying, from the data associated with the event, an amount for the event is performing by analyzing the image using optical character recognition.

13. The method of claim 8, wherein the contextual data includes calendar data of the user.

14. The method of claim 8, wherein the at least one user source is at least one of: a smartphone of a user and a wearable device of the user.

15. One or more non-transitory computer-readable media storing instructions that, when executed by a computing platform comprising at least one processor, memory, and a communication interface, cause the computing platform to:
receive historical data of a user;
train, using the historical data of the user, a machine learning model to identify patterns within user data to generate predicted pre-authorized amounts and recommendations;
retrieve contextual data for a user from at least one user source;
execute the machine learning model, wherein executing the machine learning model includes using, as inputs, the retrieved contextual data to output a pre-authorized amount for payment for an event using automatic payment processing;
receive, from an entity computing system, a request for payment and data associated with the event;
identify, from the data associated with the event, an amount for the event;
compare the identified amount to the pre-authorized amount output by the machine learning model;
responsive to determining that the identified amount is less than or equal to the pre-authorized amount:
request, from a user computing device and in real-time, current location data of the user;
receive, from the user computing device and in real-time, global positioning system (GPS) data of the user indicating the current location data of the user;
retrieve, from the contextual data, an expected location of the user;
compare the expected location of the user to the current location data of the user and location data from the data associated with the event;
responsive to determining that the current location data matches the expected location of the user and the data associated with the event;
authorize payment of the amount for the event;
update the machine learning model based on the authorized payment; and
transmit, to the entity computing system, an instruction authorizing payment of the amount for the event;
responsive to determining that the current location data does not match the expected location of the user and the location data from the data associated with the event, generate and transmit, to the user computing device, a request to authorize payment of the amount for the event; and
responsive to determining that the identified amount is more than the pre-authorized amount, generate and transmit, to the user computing device, a request to authorize payment of the amount for the event.

16. The one or more non-transitory computer-readable media of claim 15, wherein authorizing payment for the amount of the event is performed without user input.

17. The one or more non-transitory computer-readable media of claim 15, wherein the data associated with the event includes a check or bill including event data including a location of the event, a time of the event, and a date of the event.

18. The one or more non-transitory computer-readable media of claim 17, wherein the data associated with the event includes an image of the check or bill.

19. The one or more non-transitory computer-readable media of claim 18, wherein identifying, from the data associated with the event, an amount for the event is performing by analyzing the image using optical character recognition.

20. The one or more non-transitory computer-readable media of claim 15, wherein the contextual data includes calendar data of the user.

21. The one or more non-transitory computer-readable media of claim 15, wherein the at least one user source is at least one of: a smartphone of a user and a wearable device of the user.

* * * * *